(12) United States Patent
Zeik et al.

(10) Patent No.: US 10,695,966 B2
(45) Date of Patent: Jun. 30, 2020

(54) APPARATUS FOR MOLDING HOLLOW WORKPIECES

(71) Applicant: The Procter & Gamble Company, Cincinnati, OH (US)

(72) Inventors: Douglas Bruce Zeik, Liberty Township, OH (US); Richard C. Darr, Medina, OH (US); Thomas J. Simpson, Marshallville, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 754 days.

(21) Appl. No.: 15/153,757

(22) Filed: May 13, 2016

(65) Prior Publication Data

US 2017/0326767 A1 Nov. 16, 2017

(51) Int. Cl.
*B29C 45/44* (2006.01)
*B29C 45/26* (2006.01)
(Continued)

(52) U.S. Cl.
CPC .............. *B29C 45/44* (2013.01); *B29C 45/03* (2013.01); *B29C 45/262* (2013.01); *B29C 45/2681* (2013.01); *B29B 11/08* (2013.01); *B29B 2911/00* (2013.01); *B29B 2911/14453* (2013.01); *B29C 33/446* (2013.01); *B29K 2105/0058* (2013.01); *B29K 2105/258* (2013.01); *B29L 2022/00* (2013.01); *B29L 2031/56* (2013.01)

(58) Field of Classification Search
CPC . B29C 45/44; B29C 45/2612; B29C 45/2618; B29C 45/262; B29C 45/03; B29C 33/444; B29C 33/446; B29C 37/0021; B29C 2045/4485; B29C 2045/4492; B29C 33/442; B29C 45/33; B29B 2911/1444; B29B 2911/14446; B29B 2911/14453
USPC .................... 425/190, 192 R, 533, 556, 577
See application file for complete search history.

(56) References Cited

U.S. PATENT DOCUMENTS 3,266,100 A 8/1966 Belanger
5,067,891 A 11/1991 Julian
(Continued)

OTHER PUBLICATIONS

U.S. Appl. No. 15/153,758, filed May 13, 2016, Zeik, et al.
All Office Actions, U.S. Appl. No. 15/153,758.

*Primary Examiner* — Seyed Masoud Malekzadeh
*Assistant Examiner* — Sonny V Nguyen
(74) *Attorney, Agent, or Firm* — Sarah M DeCristofaro

(57) ABSTRACT

An apparatus and process for molding workpieces usable for consumer products. The workpieces may be injection molded with a cavity formed by a core pin and have an undercut, such as internal threads, in the cavity. The apparatus has a drive system with a stripper plate mounted for alternatingly forward and retracting axial movement. The stripper plate is axially driven and drives a stripper sleeve barrel cam and a core pin base barrel cam, each having respective cam followers. The respective motions of the cam followers are superimposed on a stripper sleeve insert, which drives a core pin sleeve. The core pin sleeve is subjected to responsive three dimensional motion, allowing an internally threaded workpiece to be unscrewed from the core pin sleeve. The system does not require separate drives for the core pin sleeve, a single stripper plate drive being sufficient.

19 Claims, 30 Drawing Sheets

(51) Int. Cl.
   *B29C 45/03*   (2006.01)
   *B29B 11/08*   (2006.01)
   *B29L 31/56*   (2006.01)
   *B29K 105/00*  (2006.01)
   *B29C 33/44*   (2006.01)
   *B29L 22/00*   (2006.01)

(56) References Cited

U.S. PATENT DOCUMENTS

| | | |
|---|---|---|
| 5,383,780 A | 1/1995 | McCready et al. |
| 5,421,717 A * | 6/1995 | Hynds ............... B29C 45/262 |
| | | 264/334 |
| 5,736,172 A * | 4/1998 | Urmston ............ B29C 45/4005 |
| | | 264/255 |
| 5,798,074 A | 8/1998 | McCready et al. |
| 6,238,202 B1 | 5/2001 | Joseph |
| 6,390,800 B1 | 5/2002 | Brown et al. |
| 2002/0106420 A1* | 8/2002 | Vandenberg ........ B29C 45/2602 |
| | | 425/556 |
| 2006/0051451 A1* | 3/2006 | Hutchinson ......... B29C 33/046 |
| | | 425/552 |
| 2007/0212443 A1 | 9/2007 | Li |
| 2008/0241309 A1* | 10/2008 | Niewels ............. B29C 45/4005 |
| | | 425/556 |
| 2011/0111079 A1 | 5/2011 | McCready |
| 2011/0298151 A1* | 12/2011 | Atance Orden .... B29C 45/0416 |
| | | 264/255 |
| 2011/0305786 A1* | 12/2011 | Glaesener .......... B29C 45/4005 |
| | | 425/139 |
| 2012/0135102 A1* | 5/2012 | Glaesener .......... B29C 45/4421 |
| | | 425/556 |

* cited by examiner

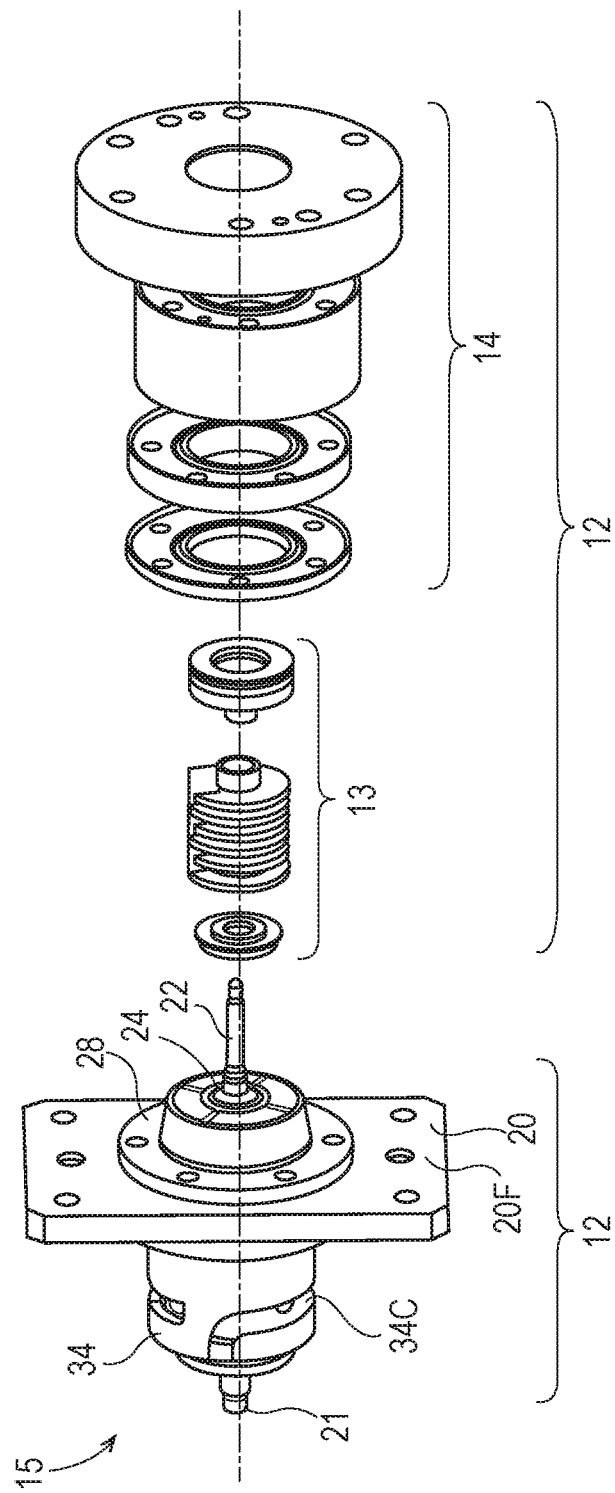

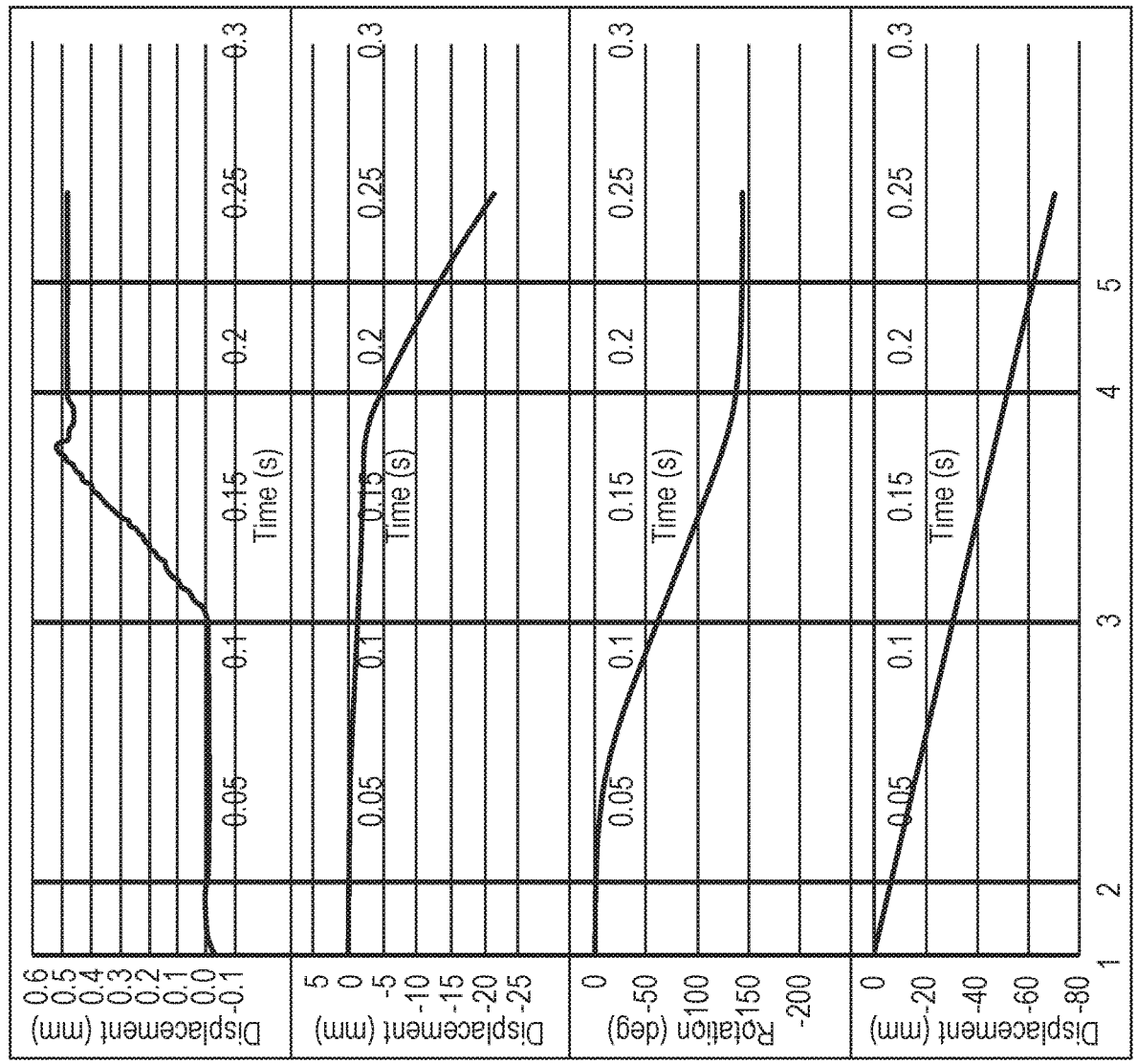

APPARATUS FOR MOLDING HOLLOW WORKPIECES

FIELD OF THE INVENTION

The present invention relates to a barrel cam drive apparatus for molding hollow workpieces, each workpiece having an undercut.

BACKGROUND OF THE INVENTION

Hollow workpieces are commonly used in industry and consumer goods. Hollow workpieces with an undercut include preforms for injection stretch blow molding into containers. The containers are usable for aerosol containers, which in turn are usable to dispense air fresheners, shave gel, shave foam, shampoo, body washes, antiperspirants/deodorants, perfumes, hard surface cleaners, etc. Other containers include water bottles, milk jugs, bottles for containing other consumer products, large water jugs, etc. The undercut in the workpiece may comprise threads, a bayonet fitting, etc.

Apparatus for molding hollow workpieces are well known in the art. Such apparatus typically have two mold halves which translate together and apart with relative motion to alternatingly open and close in an axial direction. When closed, the mold halves define a cavity which defines the shape of the workpiece to be formed. If the workpiece has a cavity or void, a core pin may be used. A core pin prevents material to be molded from being in the space occupied by the core pin, allowing a hollow part to be formed.

When the mold halves are opened, the workpiece typically rides with one of the halves. The workpiece is later stripped from the respective mold half. If the mold half has a core pin, the workpiece typically rides with the core pin and is later stripped off while the mold halves are apart.

However, if a workpiece has an undercut the process is not as simple. The workpiece cannot be stripped from the core pin because the core pin material in workpiece undercut prevents the workpiece from axially stripping off the core pin. Such a workpiece may be commonly used as a preform for injection stretch blow molding.

Yet undercuts remain an important design feature of many molded workpieces used for consumer products. Undercuts may occur, for example, in external threads, internal threads, bayonet fittings, snap fittings, grooves, etc.

Various attempts in the art have been tried to make workpieces having an undercut. For example U.S. Pat. No. 3,266,100 uses a complex assembly of collapsible segments. And this attempt makes no provision for a core pin.

One crude attempt to accommodate a core pin for workpieces having an undercut is to simply deflect the workpiece material across the portion of the core pin forming the undercut. But this approach may cause dimensional inconsistency among, and even breakage of, the workpieces. Another approach attempt to accommodate a core pin is to utilize a radially collapsible core. But this approach does not allow for molding of workpieces having a sealing face as the proximal end of the core pin. Even if a sealing face is not required for the desired workpiece, the collapsible core pin requires complex moving workpieces to accommodate the radial motion. Yet another approach utilizes a rotary core pin, so the workpiece is simply unscrewed therefrom. But this approach may require complex rotary indexing if a bayonet fitting is desired and also requires complex moving workpieces to accommodate the additional rotary motion.

The core pin may have an axial counterflow cooling line therein. The core pin may also have one or more hydraulic lines, which may make the core pin a complex assembly. An assembly of a moving core pin and various liquid lines may be susceptible to leaks and entanglement. Thus a core pin which has only axial motion is desirable.

One attempt to utilize a non-rotating and non-collapsible core pin is found in U.S. Pat. Nos. 5,383,780 and 5,798,074. This attempt utilizes a rack and pinion system. In this system, typically a single pinion gear drives plural, typically four, stripper rings. The stripper rings unscrew the respective workpieces. But this system requires a large amount of space and cannot be readily retrofitted to a mold having a conventional axial workpiece ejection system. If a different workpiece is desired, component change-out is difficult. U.S. Pat. No. 6,390,800 claims to unthread a closure for a container as the mold plates are separated. But this attempt also uses a rack gear, which can be costly and complex to operate. U.S. Pat. No. 6,238,202 uses an elongate helically splined spindle, which may have the same disadvantages as an elongate rack.

Thus, there is a need for an apparatus and process which can be retro-fitted to existing core pin molds. The present invention unexpectedly uses existing translation of a stripper plate during the molding process to both open and close one of the mold halves and to release a workpiece with an undercut, eliminating the need for a separate release drive system. The present invention also surprisingly eliminates the need for a large and cumbersome rack to drive the pinion gears. An apparatus according to the present invention having N cavities for molding may have from 1-N different workpieces made thereon, surprisingly providing flexibility not found in the art. Thus the apparatus of the present invention advantageously decouples the number of workpieces which can be made on the apparatus from the number of drive systems necessary to operate the apparatus. The invention is directed to the problem of stripping a workpiece having an undercut without requiring non-axial core pin motion.

SUMMARY OF THE INVENTION

In one embodiment the invention comprises a drive system for an injection molding apparatus. The drive system has an axis and comprises: a stripper plate for axial motion and being drivable in an axial direction, the stripper plate having a first face and a second face opposed thereto. A core pin protrudes outwardly from the first face of the stripper plate, the core pin being usable to form a cavity in a molded workpiece. The core pin is not movable relative to the stripper plate while it is in motion. A core pin sleeve is disposed radially outboard of the core pin and juxtaposed with the first face of the stripper plate, the core pin sleeve having features to form an undercut in a molded workpiece. The core pin sleeve is axially and rotatably movable relative to the stripper plate while it is in motion, and the core pin sleeve is axially and rotatably driven by axial motion of the stripper plate. The stripper plate may be mounted for bilateral alternatingly forward and retraction axial motion. Motion of the core pin sleeve can be responsive to forward motion of the stripper plate.

In another embodiment the invention comprises a drive system for an injection molding apparatus having an axis and comprising a stripper plate for axial motion and being drivable in an axial direction. The stripper plate has a first face and a second face opposed thereto. A core pin protrudes outwardly from the first face of the stripper plate and is usable to form a cavity in a molded workpiece. A core pin sleeve is disposed radially outboard of the core pin and juxtaposed with the first face of the stripper plate. The core pin sleeve has a feature, such as threads, to form an undercut in a molded workpiece. A hollow stripper sleeve is rigidly joined to the second face of the stripper plate. The stripper sleeve may be concentric with the core pin and may circumscribe the axis. The stripper sleeve has at least one stripper sleeve cam therein, the stripper sleeve cam providing for responsive motion of a respective stripper sleeve follower. A hollow stripper sleeve is rigidly joined to the second face of the stripper plate and aligned with the core pin. The stripper sleeve has at least one stripper sleeve cam therein, the stripper sleeve cam providing for responsive motion of a respective stripper sleeve follower, whereby axial movement of the stripper plate causes responsive axial and/or rotational motion of the stripper sleeve and the core pin base to be superimposed onto the core pin sleeve to release a workpiece having an undercut therefrom.

In another embodiment the invention comprises a method of molding and releasing a workpiece having an undercut from a complementary core in an injection molding apparatus, having a longitudinal axis. The method comprises the steps of: providing an injection molding apparatus drive system comprising a stripper plate reciprocatingly drivable back and forth in an axial direction and having a core pin protruding outwardly from the stripper plate, the core pin being usable to form a cavity in a molded workpiece, a core pin sleeve juxtaposed with the stripper plate, the core pin sleeve having a features to form an undercut in a molded workpiece, a hollow stripper sleeve, rigidly joined to the stripper plate and axially spaced from the core pin and circumscribing the axis, the stripper sleeve having at least one stripper sleeve cam therein providing for motion of a respective stripper sleeve follower, a core pin base rigidly joined to the core pin and being axially spaced from the stripper plate, the core pin base having at least one core pin base cam therein providing for motion of a respective core pin base follower, a stripper sleeve insert intermediate the stripper sleeve and the core pin base and being rigidly joined to the core pin sleeve, the stripper sleeve insert having an outwardly extending stripper sleeve follower cooperating with the stripper sleeve cam and an inwardly extending core pin base follower cooperating with the core pin base cam; injection molding a workpiece having a cavity onto the core pin and onto the core pin sleeve whereby the workpiece has an undercut formed by the feature of the core pin sleeve; moving the stripper plate in an axial direction, whereby the stripper sleeve and the core pin base move with the stripper plate, so that the stripper sleeve follower and the core pin base follower superimpose respective motions thereof onto the stripper sleeve insert; and moving the core pin sleeve with the stripper sleeve insert; to thereby release the workpiece from the core pin sleeve and the core pin.

BRIEF DESCRIPTION OF THE DRAWINGS

All drawings are to scale, except for schematic FIG. 1A.

FIG. 1C is a partially exploded perspective view of the apparatus of FIG. 1B.

FIG. 18A is a graphical representation of stripper plate displacement relative to the ground during one retraction stroke of approximately 70 mm, with the negative displacement being in the rearward direction.

FIG. 18B is a graphical representation of stripper sleeve insert rotation and core pin sleeve rotation about the longitudinal axis during one retraction stroke.

FIG. 18C is a graphical representation of stripper sleeve insert and core pin sleeve axial displacement during one retraction stroke, with negative displacement being in the rearward direction, away from the stripper plate.

FIG. 18D is a graphical representation of the workpiece axial displacement during one retraction stroke, with positive displacement being in the forward direction, away from the stripper plate.

DETAILED DESCRIPTION OF THE INVENTION

Figure 1B:
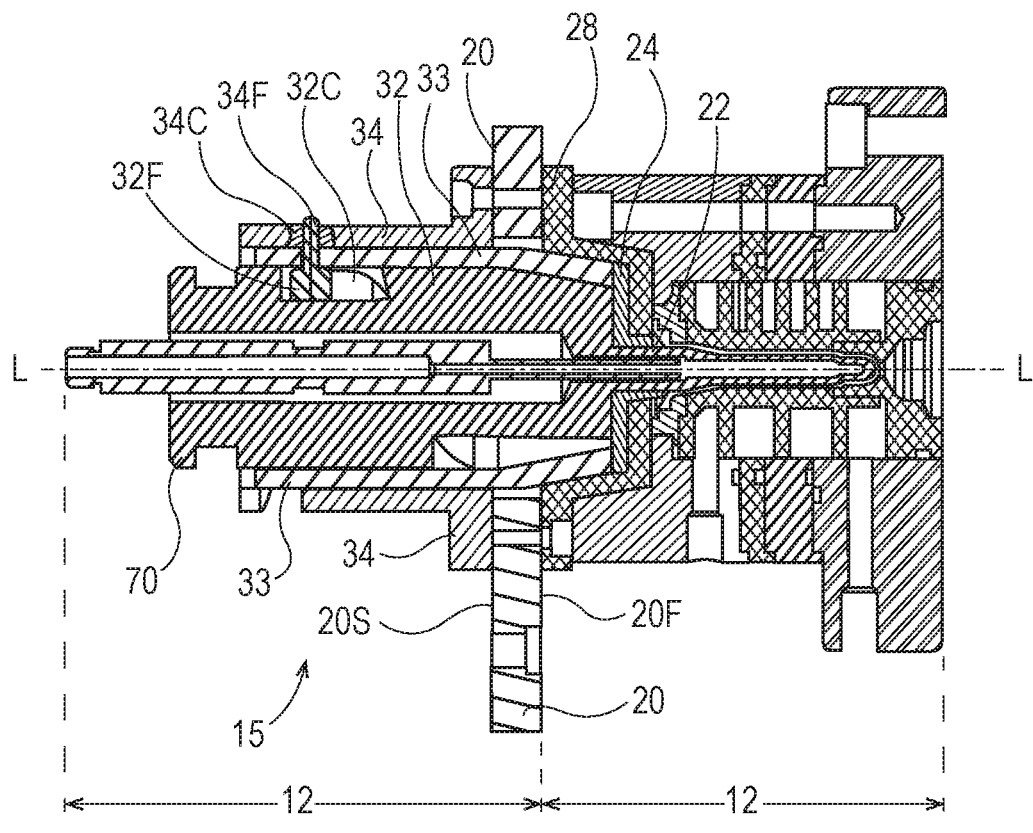
FIG. 1B is a vertical sectional view taken along line 1B-1B of FIG. 1A.
Figure 1A:
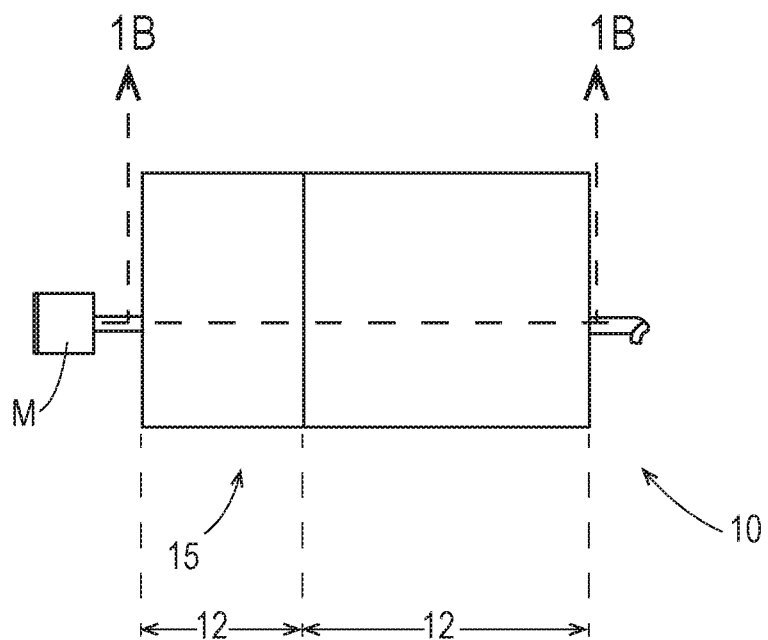
FIG. 1A is a schematic, side elevational view of an apparatus according to the present invention, and not drawn to scale.
Figure 1D:
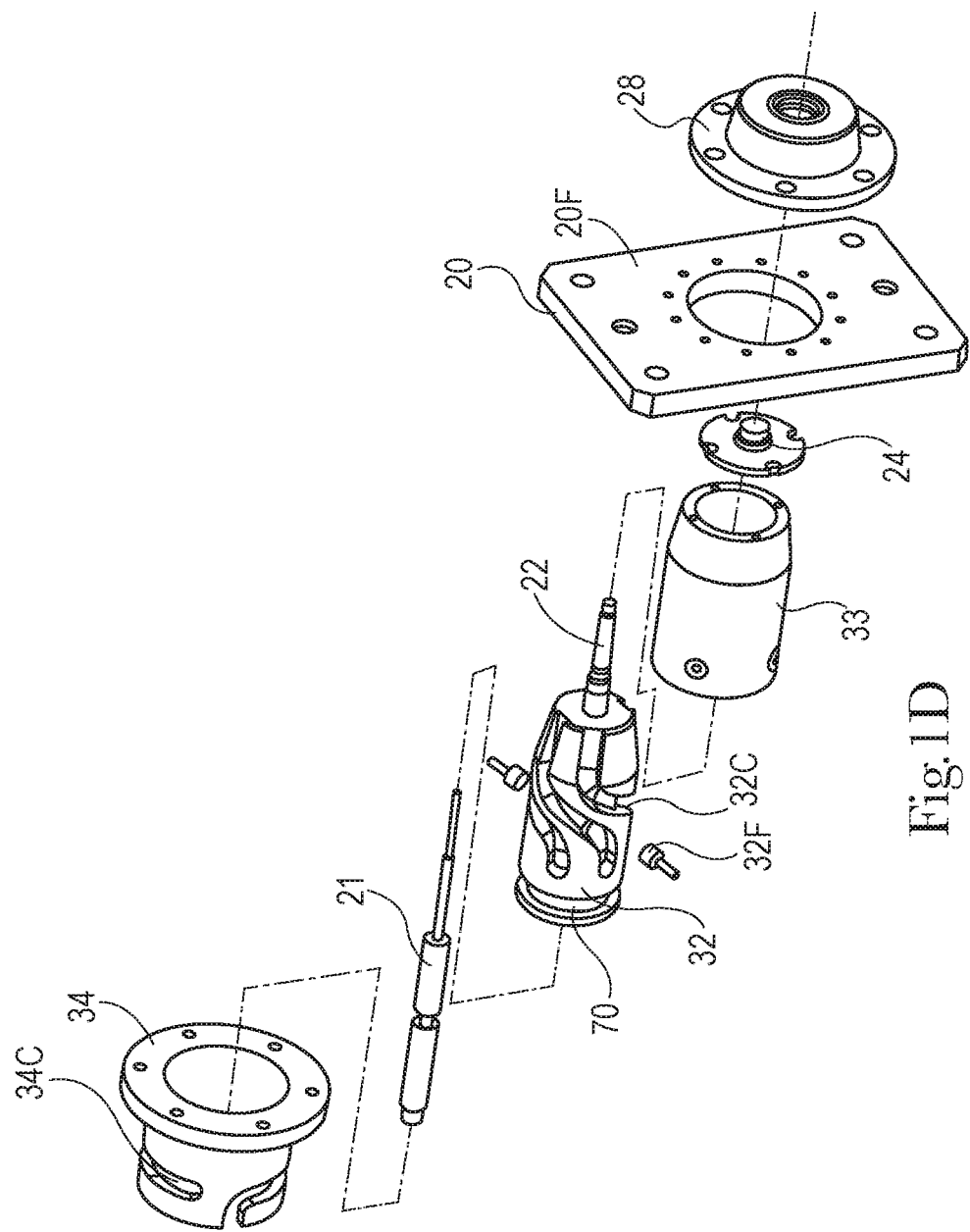
FIG. 1D is an exploded perspective view of the drive system of the apparatus of FIG. 1C.
Figure 2:
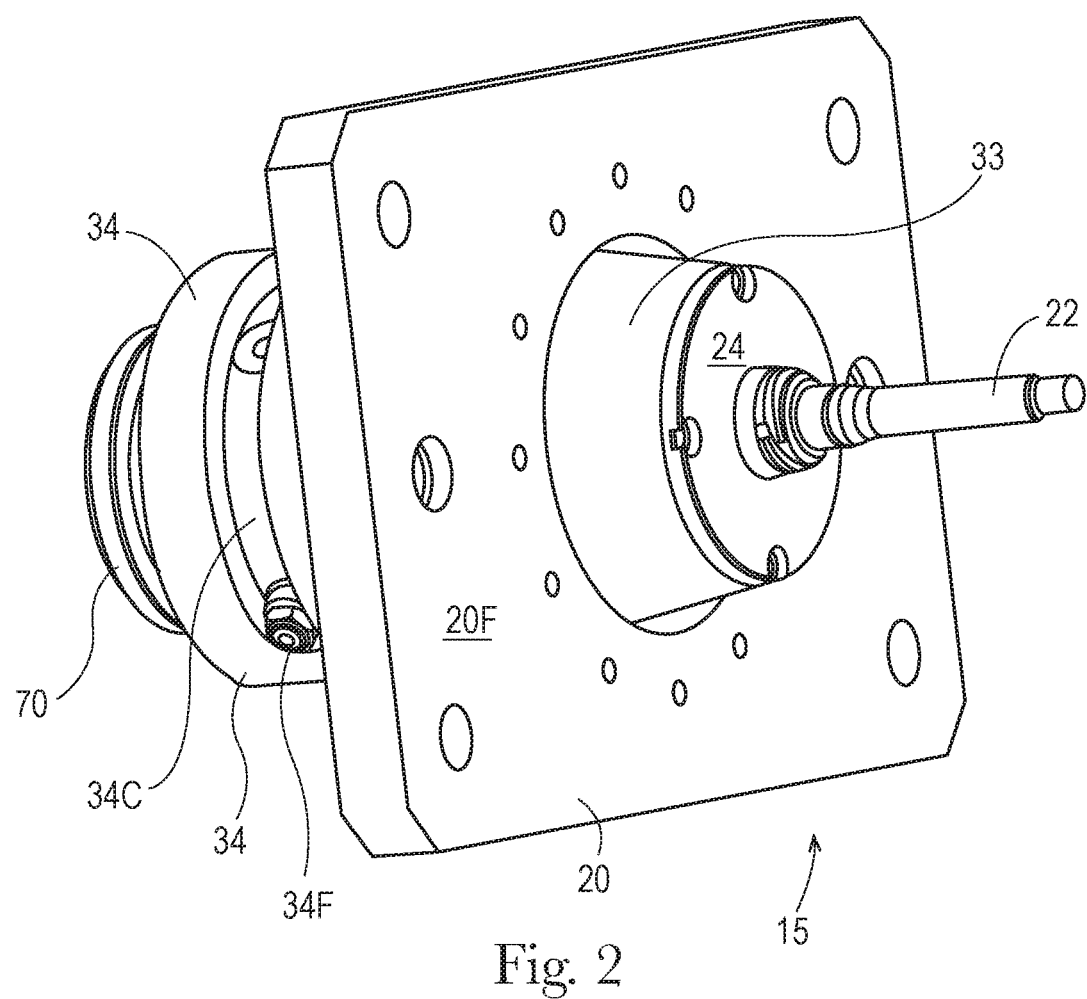
FIGS. 2 is a front perspective view of a drive system according to the present invention and having one stripper sleeve follower and the stripper ring removed for clarity.
Figure 3:
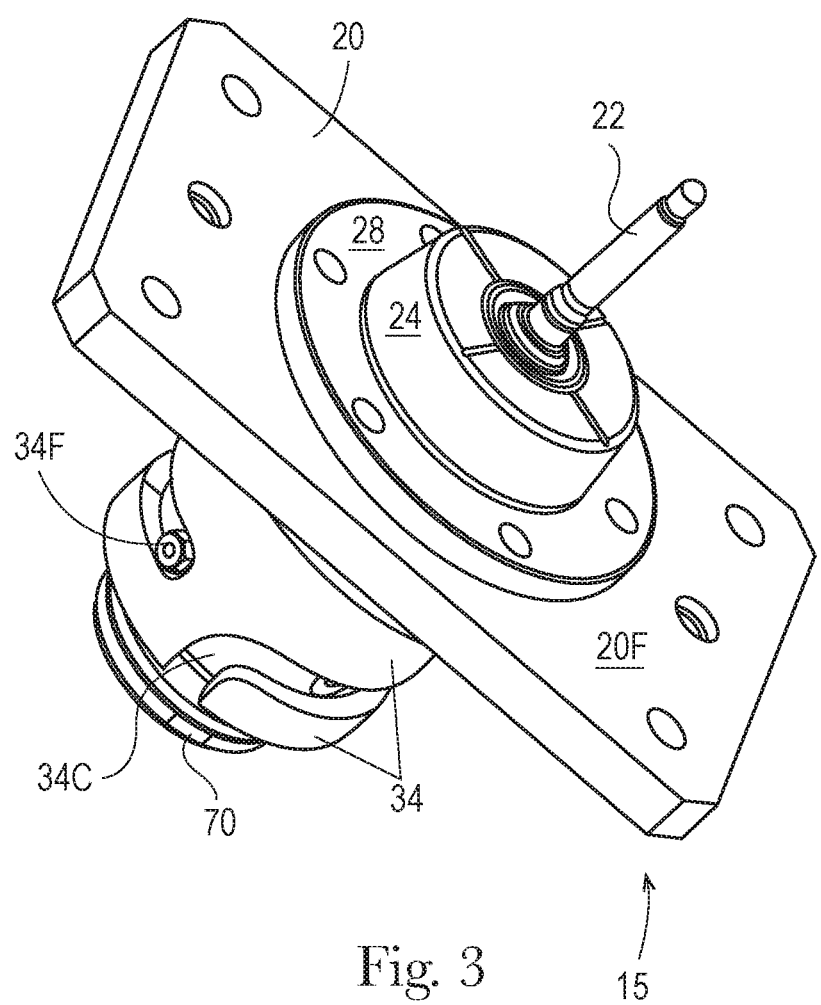
FIGS. 3-4 are front perspective views of a drive system according to the present invention and having one stripper sleeve follower removed for clarity.
Figure 4:
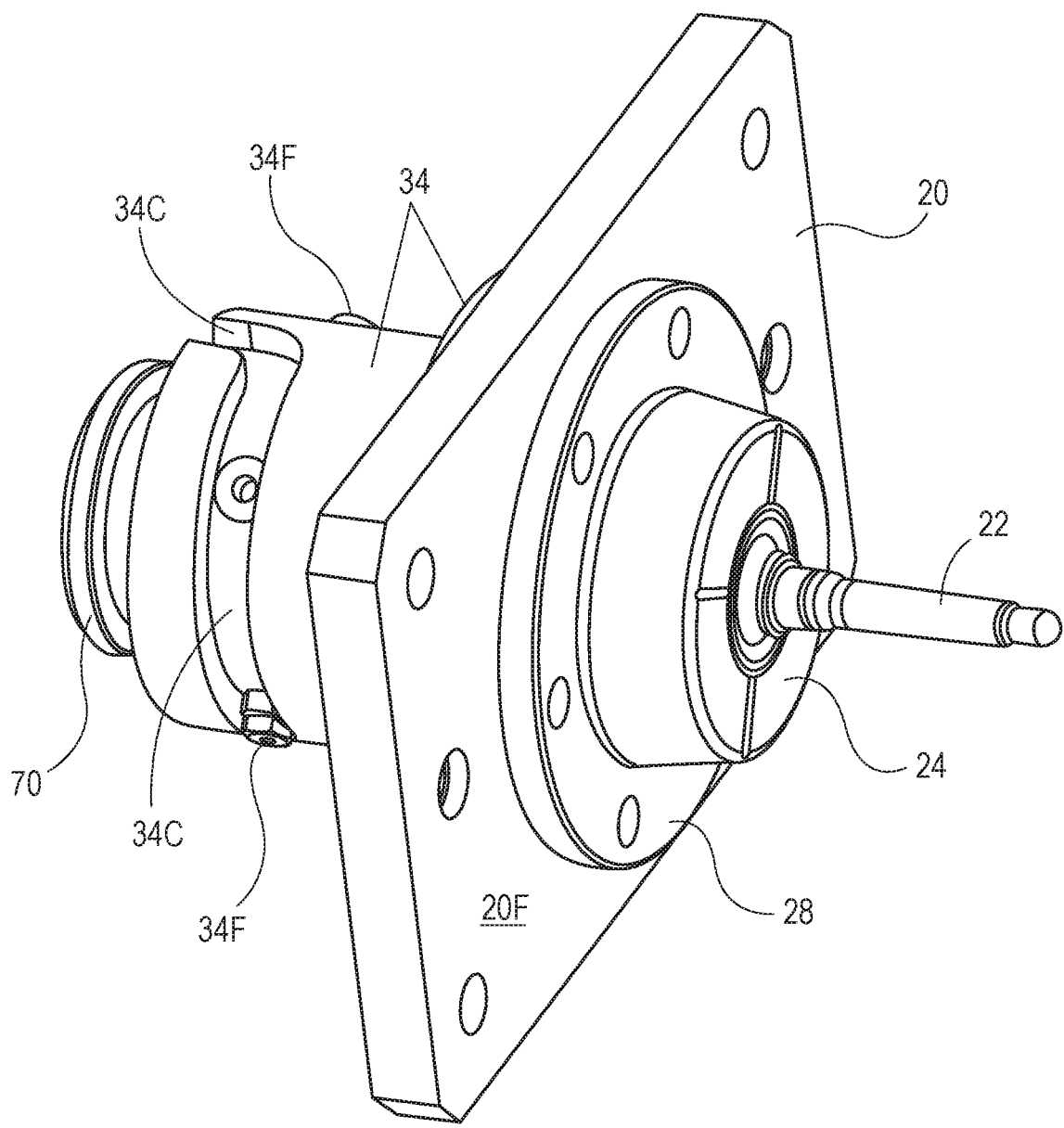
Figure 5:
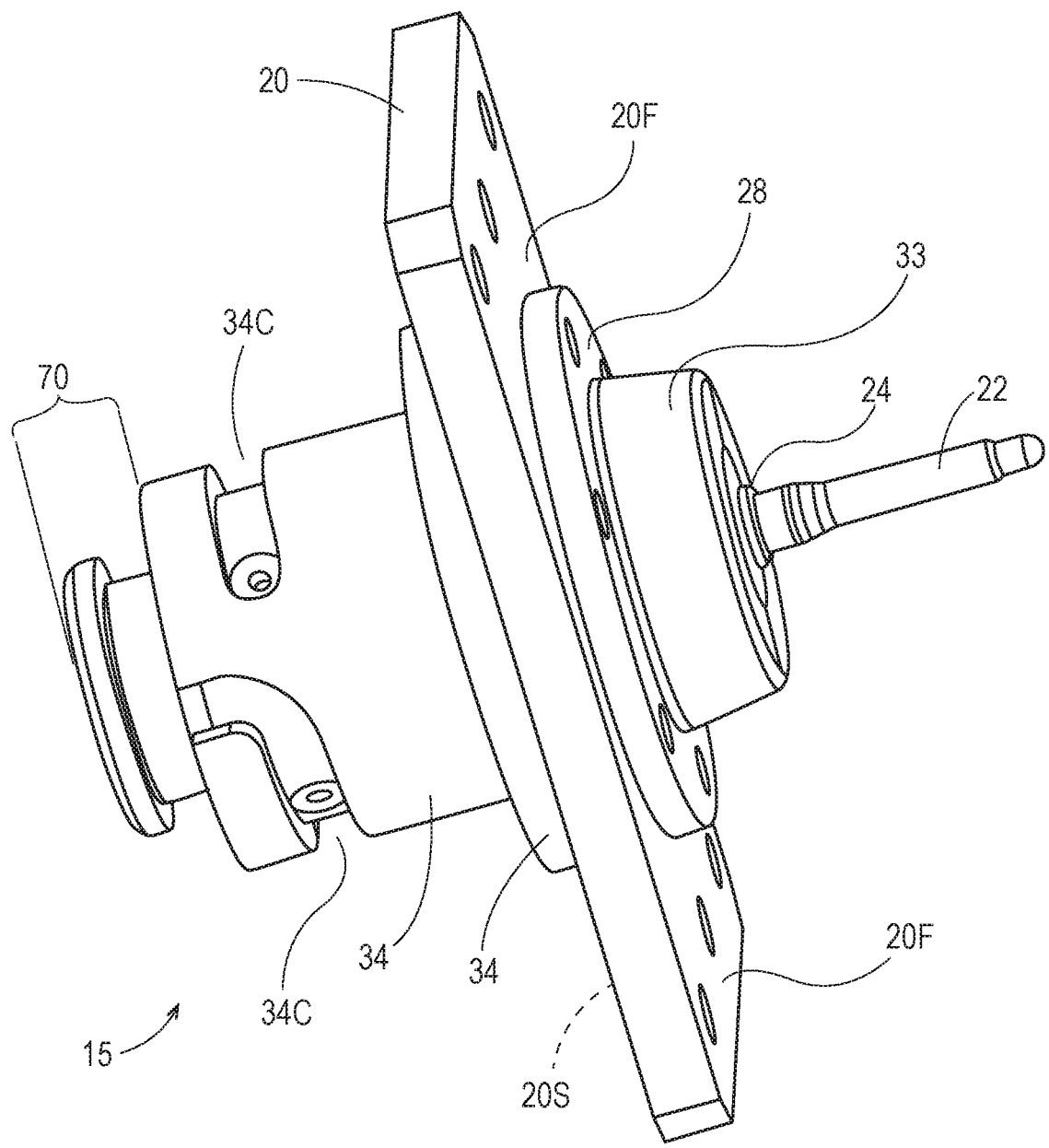
FIG. 5 is a front perspective view of a drive system according to the present invention and having both stripper sleeve followers removed for clarity.

Referring to FIGS. 1A-1D, an injection molding apparatus (10), according to the present invention comprises two mold halves (12) disposed in complementary pairs and a drive system (15) therefor. The mold halves (12) reciprocate between an open and closed positon. One or both of the mold halves (12) may translate in linear fashion towards and away from the other mold half (12) in an axial direction.

An apparatus (10) may comprise one pair, and often plural pairs, of mold halves (12). A typical apparatus (10) has from 24 to 96 pairs of mold halves (12). The pairs of mold halves (12) may be mutually identical or may be different. The apparatus (10) advantageously allows for customization of each mold half (12) pair, each drive system (15) therefor and each resulting workpiece (80) made thereby, independent of the number of workpieces (80) made by the apparatus (10).

The drive system (15) may comprise a motive force supplied by a pressurized hydraulic ram or electric motor M, and pump for injecting liquid material in the mold cavity to form a desired workpiece (80) as are well known in the art. The hydraulic ram or electric motor M may be operatively connected to either or both of the mold halves (12). A first mold half (12) may comprise a movable stripper plate (20) having a core pin (22), as set forth below. The first mold half (12) generally forms the interior portion of a hollow workpiece (80) to be molded. The second mold half (12) may be axially movable or stationary and comprises a complementary mold cavity. The second mold half (12) generally forms the exterior portion of a hollow workpiece (80) to be molded.

One mold half (12) comprises a cavity stack 13 which forms the outer periphery of the workpiece (80) to be molded. The cavity stack may be circumscribed by cavity rings 14 which provide for attachment to the balance of the apparatus (10).

Referring to FIGS. 2-5, the invention particularly comprises a drive system (15) for such an injection molding apparatus (10). The drive system (15) comprises an assembly of various components with a stripper plate (20) forming a large component of a first mold half (12). The axially movable stripper plate (20) provides a frame to which other components of the drive system (15) may be rigidly or movably mounted. The stripper plate (20) has a first face 20F and a second face (20S) opposed thereto.

By rigid or rigidly, it is meant that two components are directly joined together or are joined together through an intermediate member such that the two components move together without functionally discernable movement therebetween relative to each other. Functionally discernable movement is relative movement between the components which adversely affects the finished workpiece (80) or operation of the injection molding apparatus. By movable or movably, it is meant that one workpiece (80) may functionally change position relative to another, particularly in an axial and/or circumferential direction.

One component may circumscribe another, particularly about the longitudinal axis L-L defined by the core pin (22). By circumscribe it is mean that one component literally or functionally encompasses 360 degrees of another component. Unless otherwise stated herein, a component which circumscribes another may be arcuate about such component. For example, a cam surface, as described below, may circumscribe a respective cam as necessary to unscrew a workpiece (80) 360 degrees or more. Alternatively, a cam surface may subtend only 90 degrees of a cam if, for example, a workpiece (80) having a bayonet fitting subtending 90 degrees or less is desired.

The stripper plate (20) moves back and forth in bilateral, reciprocating fashion, defining an axial direction. As used herein, axial movement or axial motion refers to translation in the axial direction. Axial rotation or axially rotatable refers to rotation around the axial direction. Axial movement of the stripper plate (20) may drive all other motion and rotation described herein, obviating the need for a separate drive system (15) to unscrew the workpiece (80). As used herein the forward axial direction is towards the distal end of the core pin (22). The rearward axial direction is towards the collar (70) of the core pin base (32). The core pin (22) is further described hereinbelow. The first surface of the stripper plate (20) faces towards the forward direction and the second face (20S), opposed thereto, faces towards the rearward direction.

Each axial reciprocation of the stripper plate (20), back and forth, completes one cycle. Movement herein is described relative to the stripper plate (20) while it is in motion, particularly starting from a retracted position and moving forward.

The stripper plate (20) may be disposed transverse to, and particularly generally perpendicular to the axial direction. One of skill will understand that while only a left stripper plate (20) is shown for simplicity, the mold will typically also comprise a right stripper plate (20), and related components which may be stationary or which may reciprocate out of phase with the left stripper plate (20). The stripper plate (20) may provide a frame and mount for remaining components of the invention.

The stripper plate (20) is axially driven in known fashion using known means and controls therefor. One of the unpredicted benefits of the claimed invention is that it can prophetically be retrofitted to existing machinery.

A stripper ring (28) is rigidly mounted to the front of the stripper plate (20). The stripper ring (28) and stripper plate (20) may comprise an integral assembly or separate elements securely joined together. The stripper ring (28) provides a frame and mount for a core pin sleeve (24). The stripper plate (20) and stripper ring (28) are shown with bolt holes, the bolts being omitted for clarity.

The core pin sleeve (24) is axially rotatable, axially movable relative to the stripper ring (28) and may be concentrically mounted in the stripper ring (28). The core pin sleeve (24) may axially rotate with respect to the stripper ring (28)/stripper plate (20) and the sleeve, described below. The core pin sleeve (24) may be mounted in, and particularly be concentrically mounted in a hole in the stripper ring (28) and protrude therethrough. The core pin sleeve (24) may contain threads or another feature which forms the undercut in the workpiece (80) to be molded.

A core pin (22) may forwardly protrude through a hole in the core pin sleeve (24). The core pin (22) may provide for forming a cavity in the workpiece (80) to be molded. The core pin (22) is stationary relative to the stripper ring/stripper plate (20). The core pin (22) is joined to and forwardly projects from a core pin base (32) as described more fully below. The core pin (22) may have a length of at least 4, 6, 8, or 10 cm and less than 25, 20, 15 or 10 cm, to form a workpiece (80) of generally equivalent length. The core pin (22) does not translate or rotate relative to the stripper plate (20), advantageously minimizing or even preventing tangling of cooling lines therein, as occurs with prior art systems. A counterflow bubbler (21) may be disposed within the core pin (22) for the provision of cooling liquid, as is known in the art.

The core pin (22) and core pin base (32) may comprise a unitary assembly. This arrangement provides the benefit of simplicity of manufacture. If the core pin (22)/core pin base (32) are desired to be retro-fitted to existing machinery, only a single change-out of this component is needed.

Alternatively, the core pin (22) and core pin base (32) may comprise separate elements rigidly joined together. This arrangement provides the benefit of flexibility. A particular core pin base (32) may be used with a particular core pin (22) for production of workpieces (80), as desired. If a different workpiece (80) having the same cavity and different undercut is desired, the operator need only change out the core pin base (32). Or if a different workpiece (80) having a different cavity and same undercut is desired, the operator need only change out the core pin (22). All such options can be retro-fitted to existing machinery.

Figure 6:
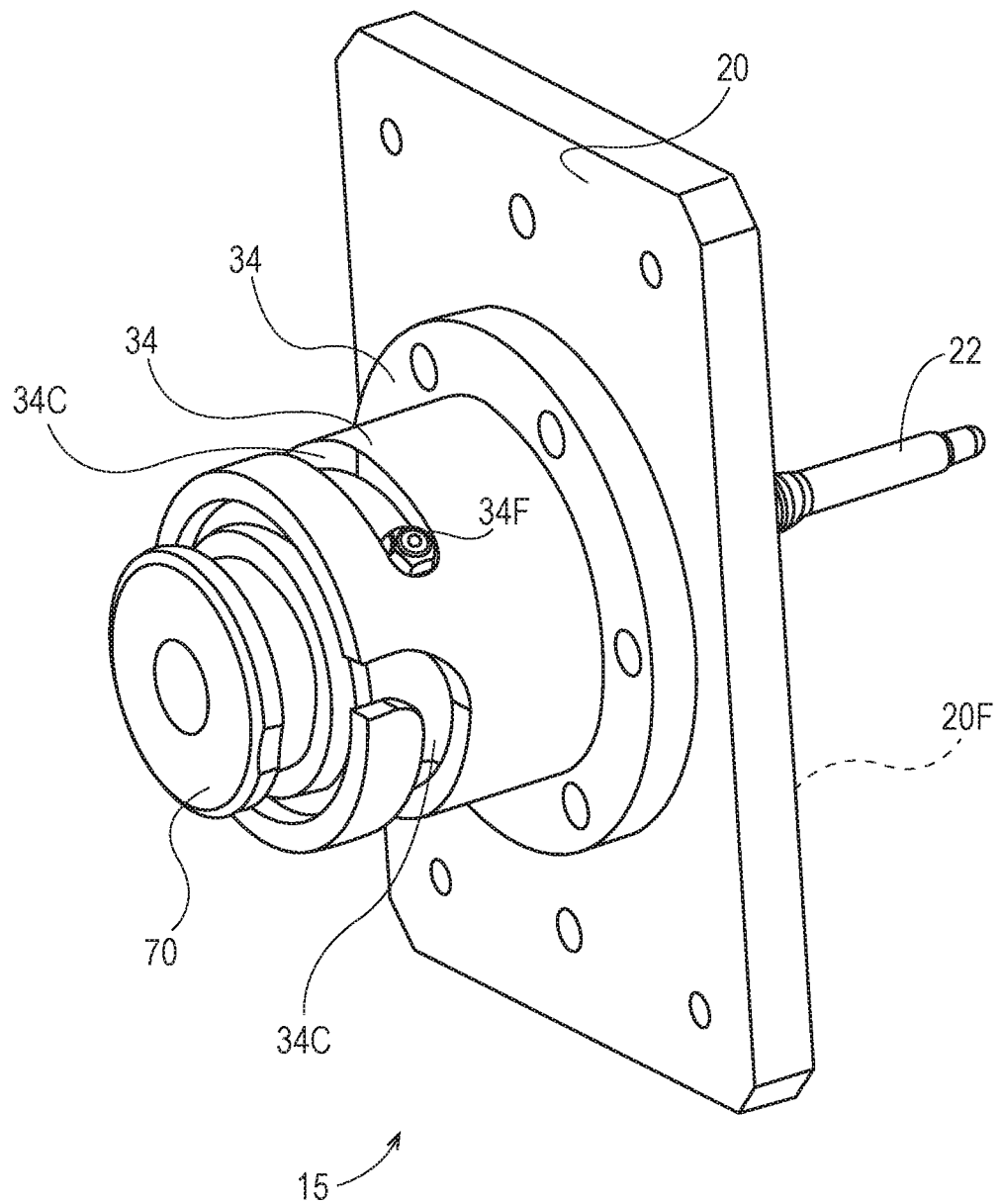
FIG. 6 is a rear perspective view of a drive system according to the present invention.

Referring to FIG. 6, the assembly further comprises a stripper sleeve (34) rearwardly projecting from the stripper plate (20). The stripper sleeve (34) is securely joined to the stripper plate (20) and axially moves therewith. The stripper sleeve (34)/stripper plate (20) may comprise an integral assembly or separate elements securely joined together.

The stripper sleeve (34) may be concentric with the hole in the stripper ring/stripper plate (20) and may also concentrically circumscribe other components such as the core pin base (32). The stripper sleeve (34) has a three dimensional cam surface therein. A stripper sleeve follower (34F), as described below, rides in this three dimensional cam surface. The follower is driven by the stripper sleeve (34)/stripper plate (20) assembly. Thus the drive system (15) provides for three dimension motion of the core pin sleeve (24) based upon three dimensional motions provided by the core pin base cam (32) and stripper sleeve cam (34C).

A stripper sleeve (34) insert is disposed intermediate, and particularly may be concentrically disposed between the core pin base (32) and the stripper sleeve. The stripper sleeve insert (33) moves axially and rotatably with respect to both the core pin base (32) and the stripper sleeve (34). The core pin sleeve (24) is rigidly mounted to the stripper sleeve insert (33).

Figure 7:
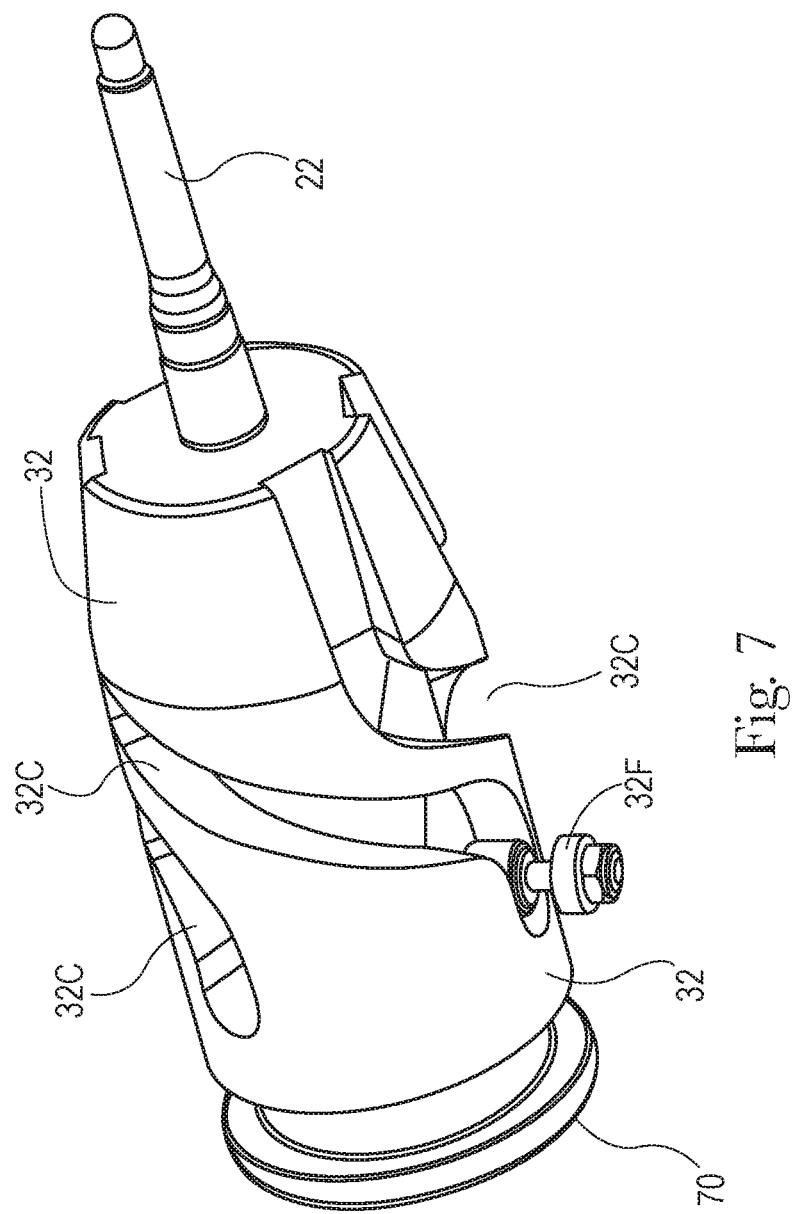
FIG. 7 is a front perspective view of a core pin, core pin base and collar, and having a core pin base follower.
Figure 8:
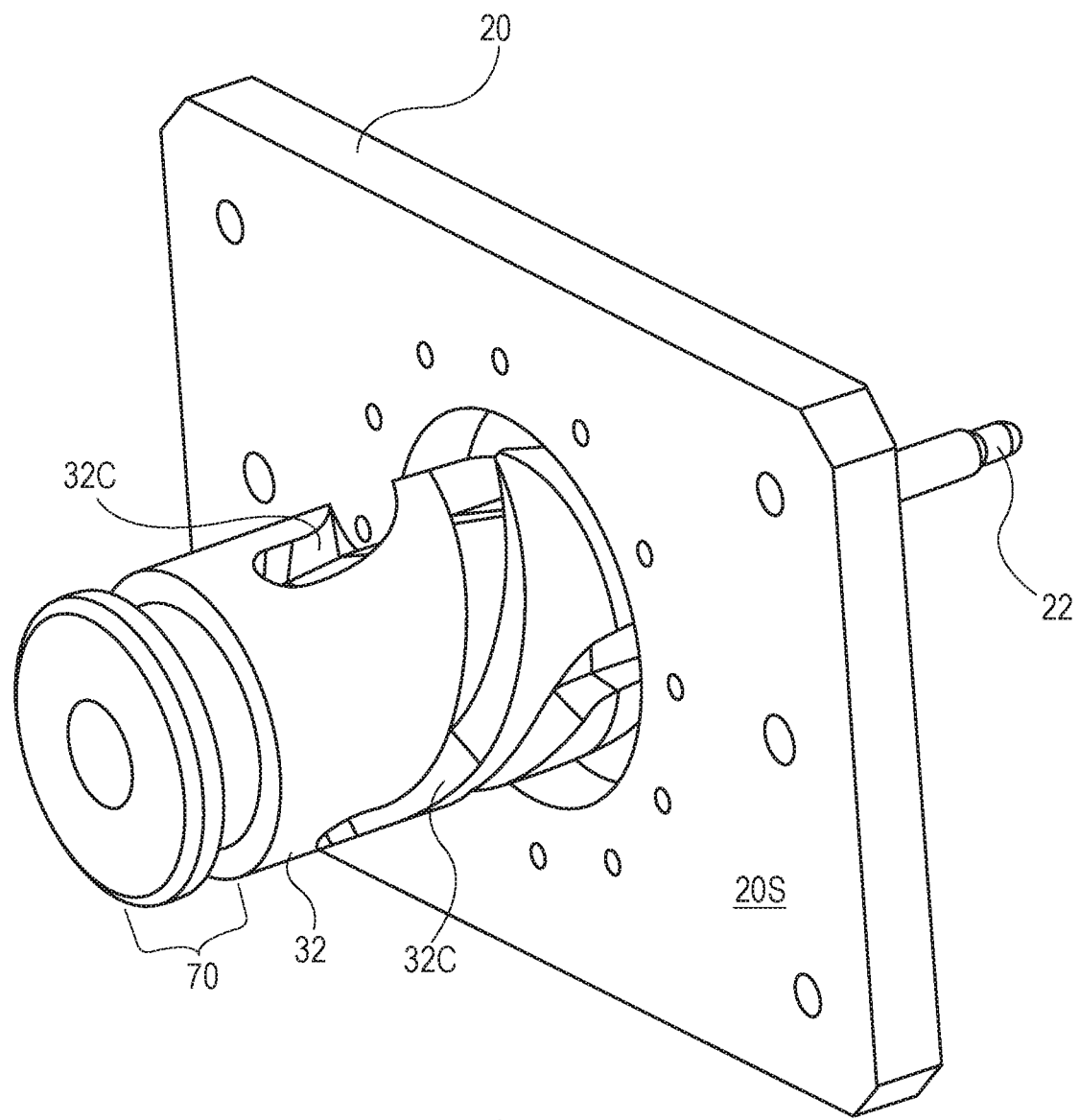
FIG. 8 is a rear perspective view of the core pin, core pin base and collar of FIG. 7 in position through a hole in the stripper plate.

Referring to FIGS. 7-8 and examining the components in more detail, the core pin (22) and core pin base (32) may be concentric with respect to each other. The core pin (22) may define the longitudinal axis L-L, as described above. The core pin (22) also partially defines the shape of the cavity in the workpiece (80) which is molded. The proximal end of the core pin base (32) may have a collar (70), or other known means to attach the core pin (22) to the balance of the apparatus in known fashion.

The core pin base (32) has at least one groove therein defining a three dimensional core pin base cam (32C), generically known known as a barrel cam. The groove, e.g. core pin base cam (32C), defines the compound motion of a core pin base follower (32F), as described below. While a core pin base (32) having two core pin base cams (32C) therein is shown, one of skill will recognize that a single core pin base cam (32C) or more than two core pin base cams (32C) can be incorporated into a single core pin base (32). This arrangement allows a first core pin base cam (32C) to be used with a first workpiece (80), a second core pin base cam (32C) to be used with a second workpiece (80), etc., all without requiring an additional core pin base (32) to be deployed. One of skill will recognize that the core pin base cam (32C) and/or stripper sleeve cam (34C) may comprise a raised track rather than a groove.

The core pin base cam (32C) may have three or more sections. At the rearward position in the core pin base (32) is a rearward portion of the core pin base cam (32C) which provides for predominantly or entirely axial motion of the core pin base follower (32F). The stripper plates (20) are axially separated in the rearward direction, without using the cam, then moved forward to close. During the first phase of rearward motion, the core pin base follower (32F) breaks any residual suction inside the workpiece (80) from the core pin (22) during movement in this portion of the core pin base cam (32C).

The second, or central, portion of the core pin base cam (32C) wraps the core pin base (32) in spiral fashion. When the core pin base follower (32F) is in this portion of the core pin base cam (32C), the core pin base follower (32F), through the stripper sleeve (34) insert as described below, axially rotates the core pin sleeve (24) during continued rearward motion of the stripper plate (20). If the undercut comprises internal and/or external threads, the core pin sleeve (24) is turned in the unscrewing direction of such threads. The amount of circumferential wrap of this core pin base cam (32C) should be at least as great as the amount of circumferential wrap of the threads, or other undercut, to be unscrewed, and may be measured in degrees. In one non-limiting example hereunder, a workpiece (80) may have four threads, each thread subtending 90 degrees and be 90 degrees out of phase. If so, the core pin base cam (32C) may subtend 90 degrees, 91 degrees, 92 degrees, 95 degrees, 120 degrees, or more, to ensure that the workpiece (80) is completely unscrewed from the core pin (22). That is the core pin base cam (32C) may optionally exceed the circumferential thread wrap by at least one 1, 2, 3, 4, 5, 10, 20, 30 or 40 degrees, but optionally less than 90, 80, 70, or 60 degrees.

The third portion of the core pin base cam (32C), being forwardly disposed, is also generally axially oriented and may be axially parallel. During this portion of the stripper plate (20) forward travel, the core pin base follower (32F) only moves axially, and does not axially rotate. Either or both of the first and third potions of the core pin base cam (32C) may be axially parallel or nearly so.

Figure 9:
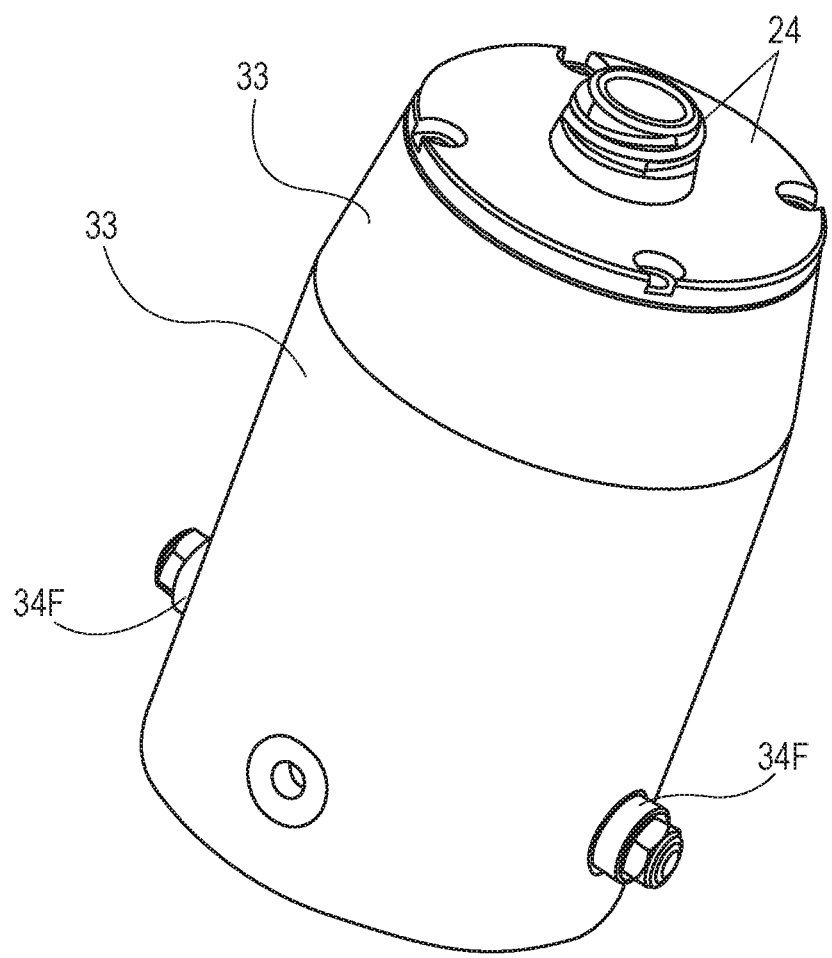
FIG. 9 is a perspective view of a stripper sleeve insert and core pin sleeve, with two stripper sleeve followers and hole for a core pin base follower.
Figure 10:
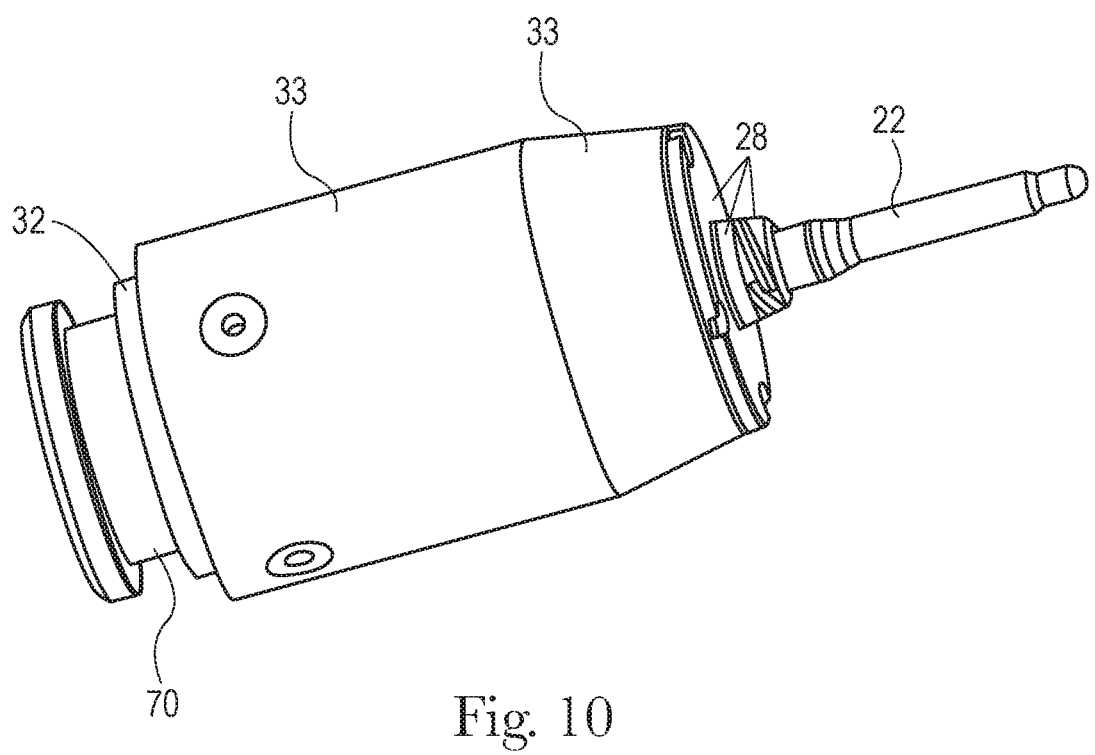
FIG. 10 is a perspective view of the stripper sleeve insert of FIG. 9, having a collar, core pin base and core pin disposed therein.
Figure 11:
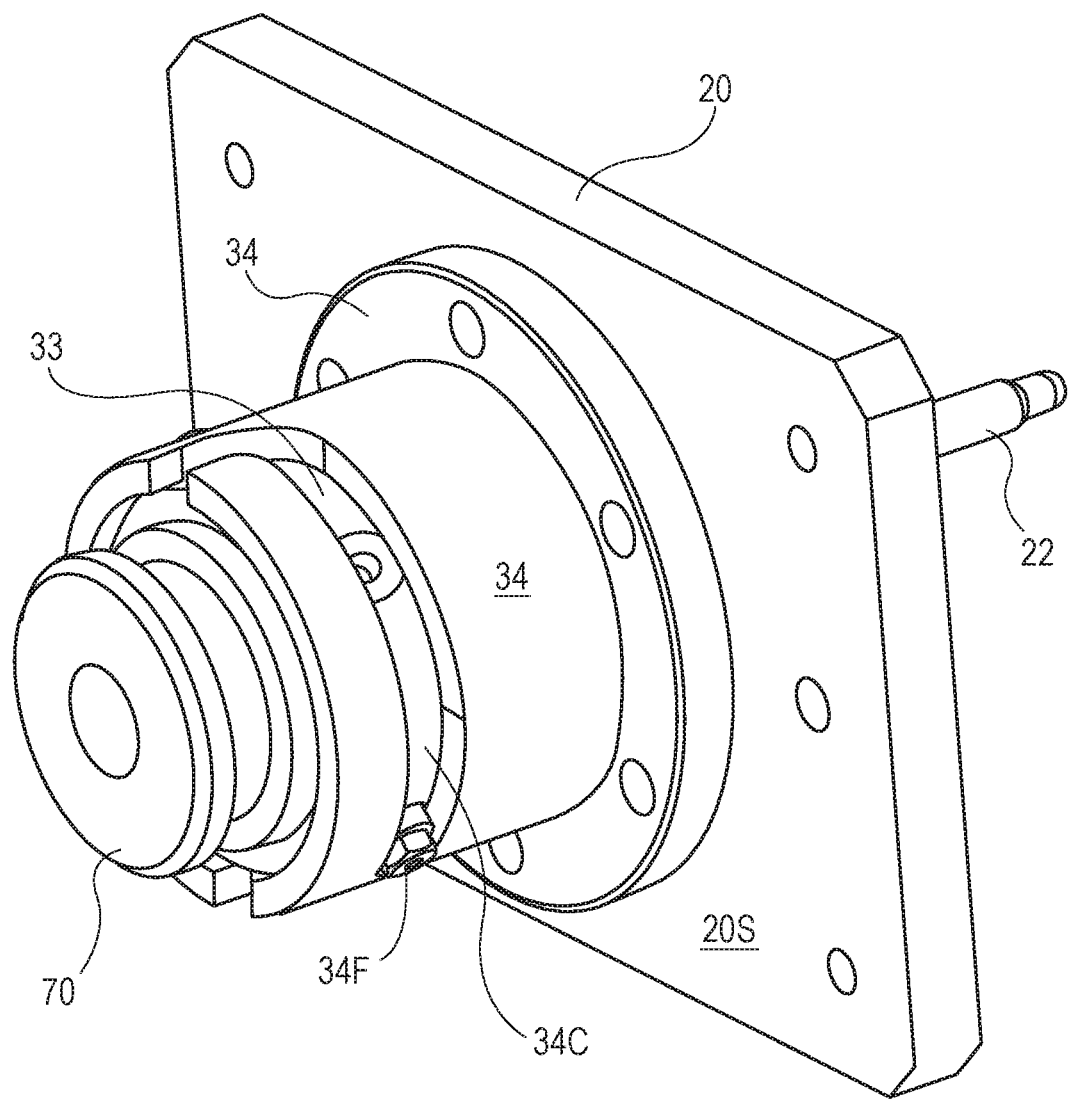
FIG. 11 is a rear perspective view of the subassembly of FIG. 10 in place on a stripper plate.

Referring to FIGS. 9-11, the stripper sleeve (34) insert circumscribes the core pin base (32). The stripper sleeve insert (33) may have one or more stripper sleeve followers (34F) and one or more core pin base followers (32F), two being of each being feasible, it being understood that the exact number of followers is not critical, so long as the compound motion described herein can be achieved. Plural stripper sleeve followers (34F) may be equally circumferentially spaced about the axis.

The forward end of the stripper sleeve insert (33) may forwardly terminate at the core pin sleeve (24) and synchronously moves therewith. The followers may be disposed at any axial position of the stripper sleeve insert (33), it being found that followers generally rearwardly disposed, away from the core pin (22), work well. Each follower may comprise an inwardly projecting stem forming the core pin base follower (32F) and an outwardly projecting stem, forming the stripper sleeve follower (34F). It is understood that inwardly and outwardly refer to radial directions with respect to the inner and outer surfaces of the stripper sleeve insert (33), respectively. The inwardly projecting stem and outwardly projecting stem of a respective follower may be co-linear and formed from an integral piece of metal.

Each stem may have a roller mounted thereon, for rotation in the respective cam. Thus a single follower will preferably have two rollers, one each on the inwardly projecting stem and the outwardly projecting stem. The rollers will likely be circumferentially aligned, but radially offset. A roller may be made of nylon or other material suitable for the compound motion described herein.

The followers may have a stem which projects radially inwardly, to engage the of the core pin base cam (32C). This geometry allows the followers to move the stripper sleeve insert (33) according the core pin base follower (32F) as a function of movement of the core pin base (32) being non-rotatable and indirectly attached to the stripper plate (20). The stripper sleeve followers (34F) also project radially outward from the stripper sleeve insert (33).

Figure 12:
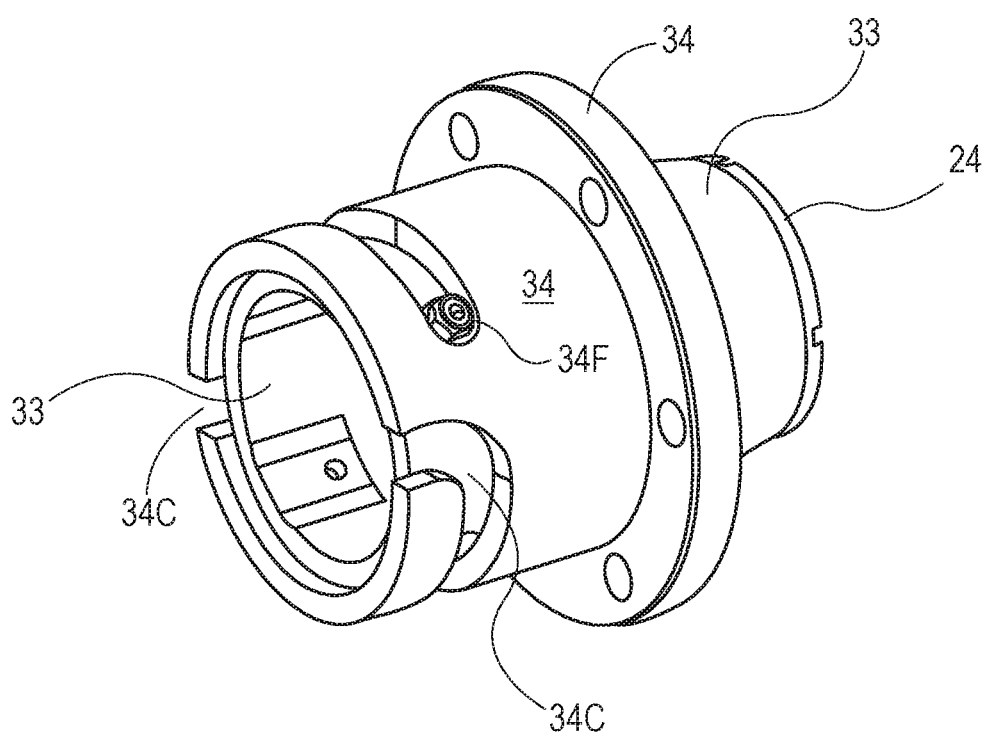
FIG. 12 is a rear perspective view of a stripper sleeve according to the present invention, and having a stripper sleeve insert therein and a stripper sleeve follower.
Figure 13:
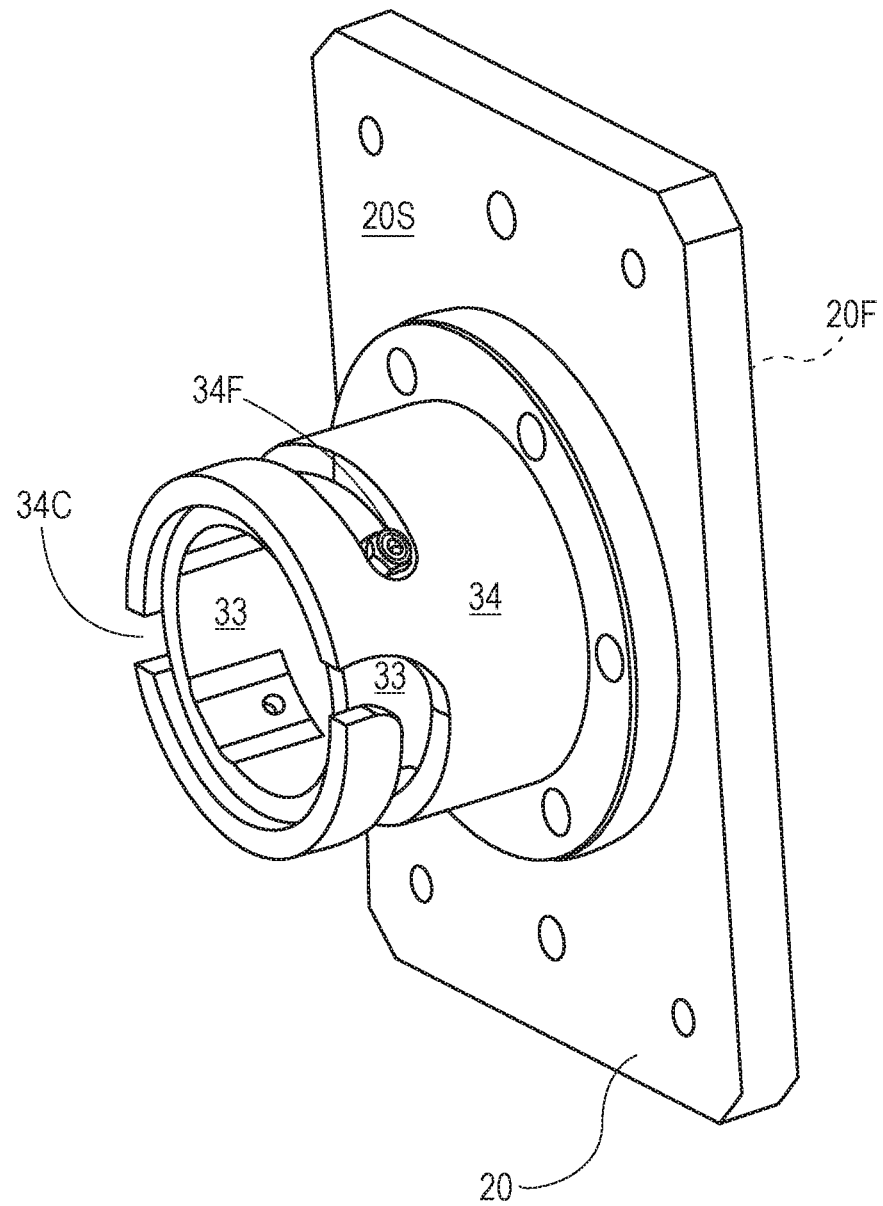
FIG. 13 is a rear perspective view of the stripper sleeve and stripper sleeve insert of FIG. 12 disposed in a stripper plate.
Figure 14:
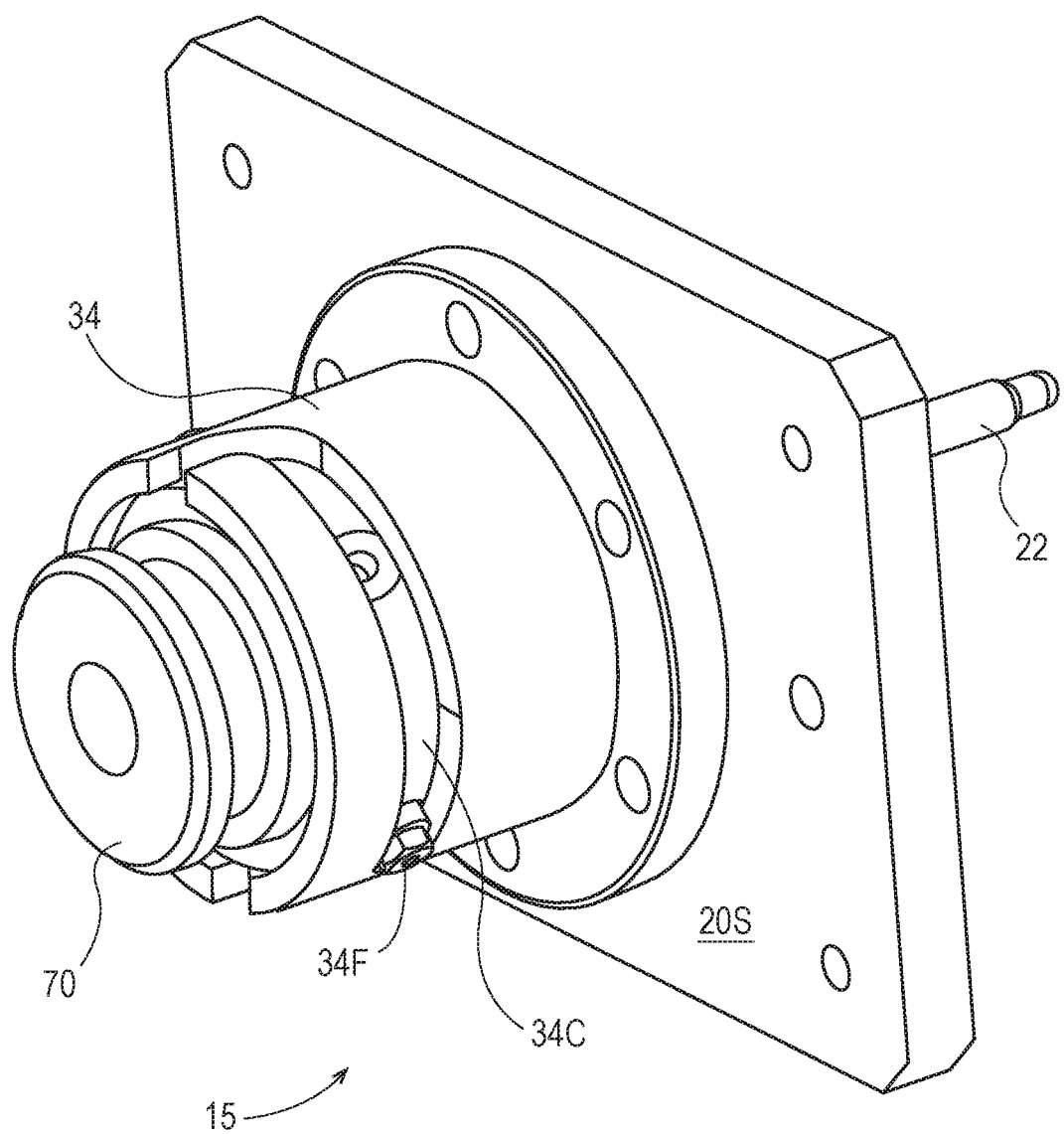
FIG. 14 is a rear perspective view of the subassembly of FIG. 13 having a collar, core pin base and core pin inserted in the stripper sleeve insert.

Referring to FIGS. 12-14, the outwardly projecting stems of the followers engage the stripper sleeve cams (34C) of the stripper sleeve. The stripper sleeve (34) is rigidly mounted to and synchronously moves with the stripper plate (20).

The stripper sleeve, like the core pin base (32), has a stripper sleeve cam (34C) with three portions, it being understood that the number of cams is matched to the number of respective followers The first, or rearward, portion of the stripper sleeve cam (34C) may optionally be open to the back of the stripper sleeve. The first portion of this cam may be generally or identically axially parallel, minimizing or preventing axial rotation of the core pin sleeve (24) during this portion of stripper plate (20) travel.

Figure 15:
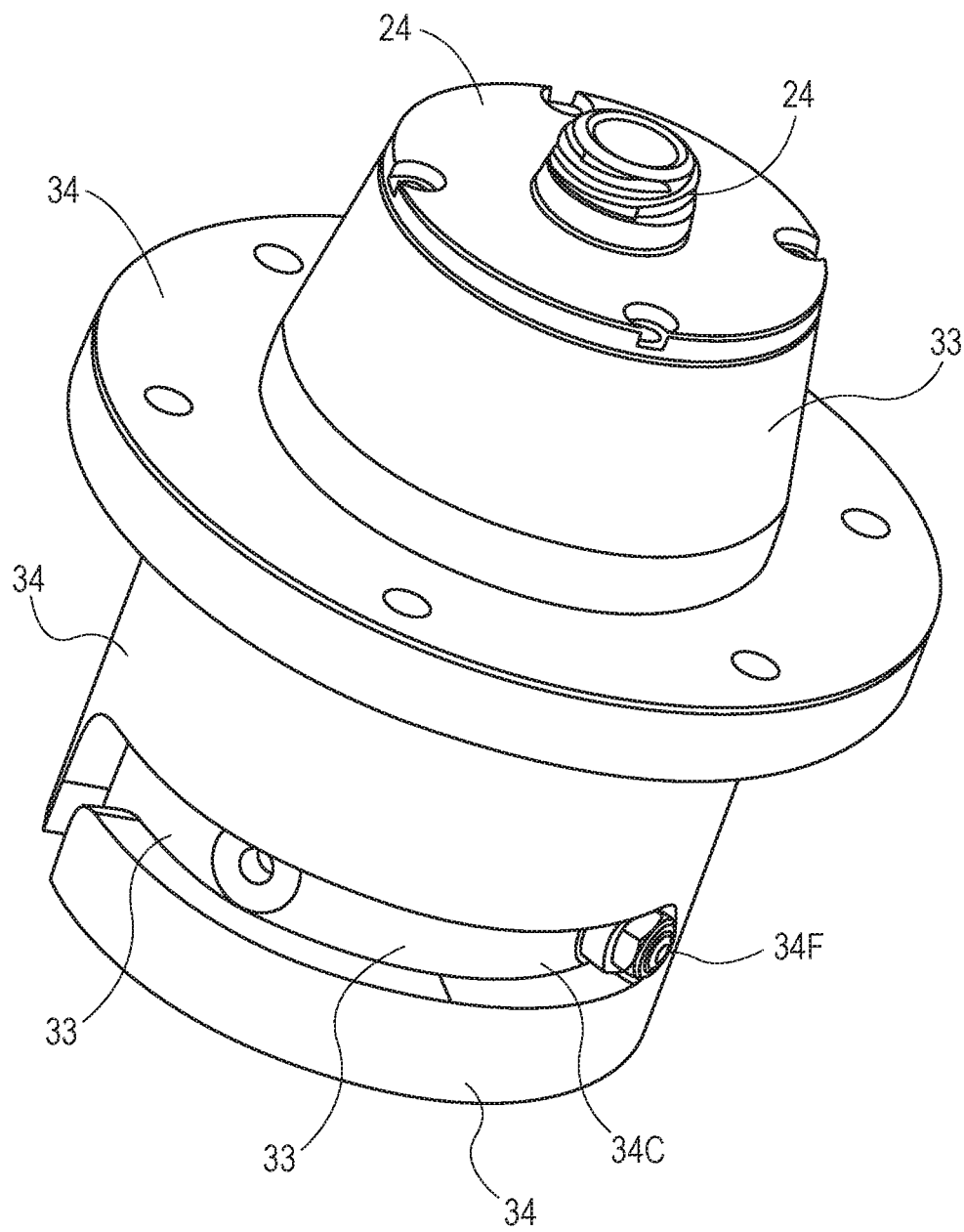
FIG. 15 is a front perspective view of a stripper sleeve and stripper sleeve insert subassembly according to the present invention, and having a stripper sleeve follower and hole for a core pin base follower.
Figure 16:
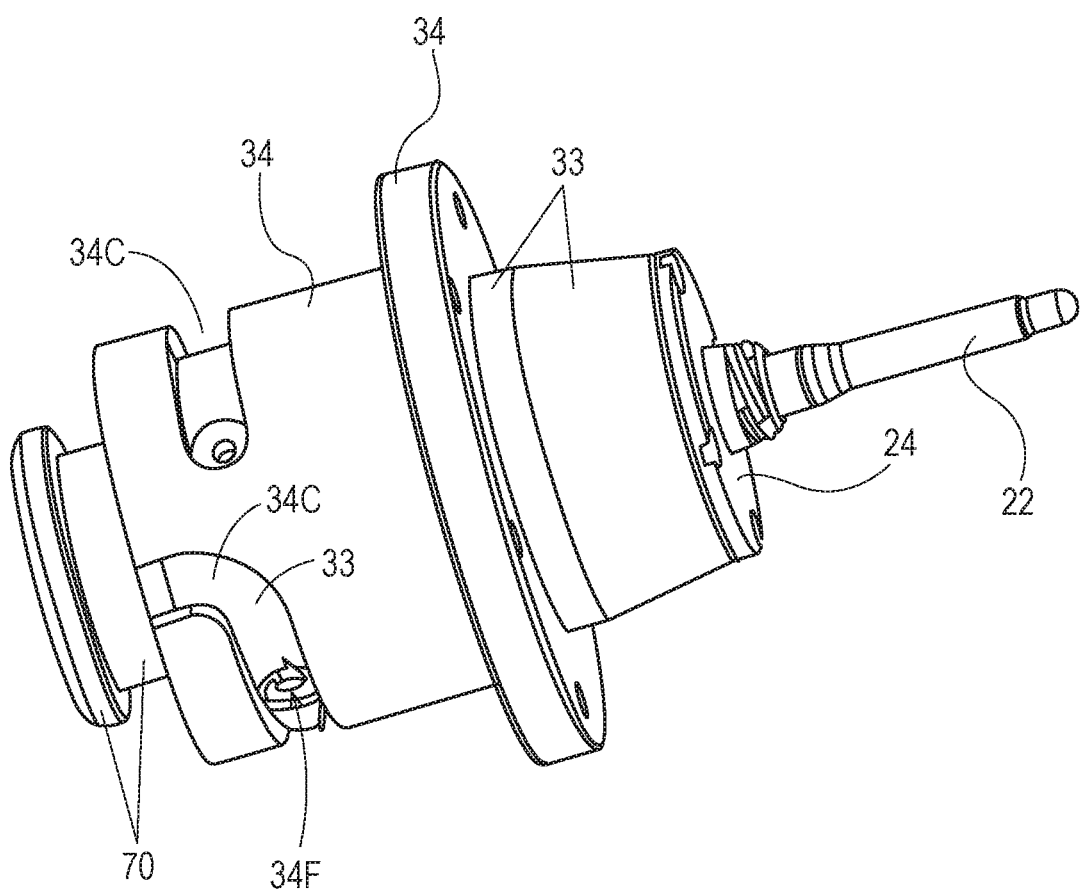
FIG. 16 is a front perspective view of the subassembly of FIG. 15 and further having a collar, core pin base and core pin inserted into the stripper sleeve insert.
Figure 17:
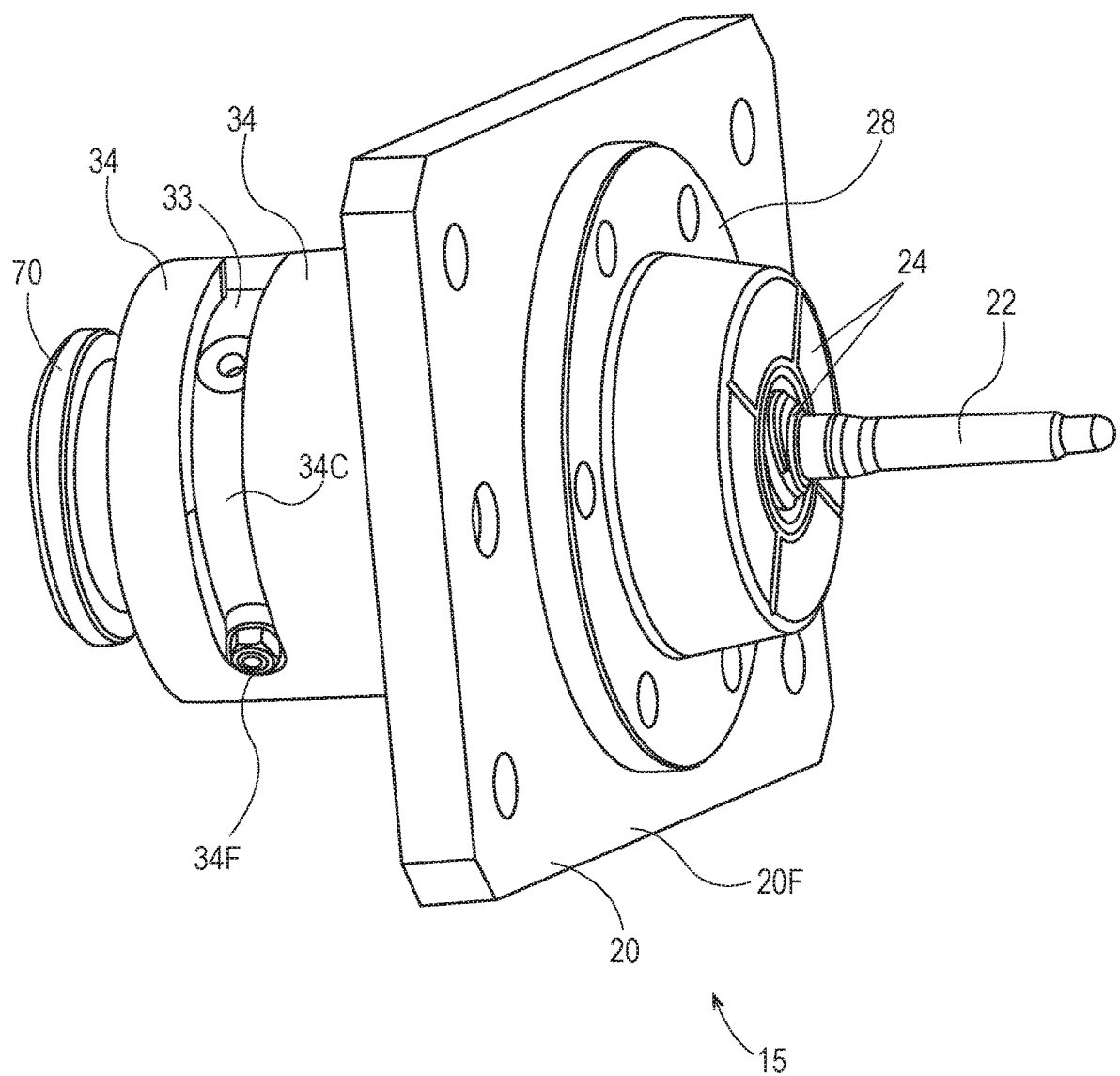
FIG. 17 is a front perspective view of a drive system according to the present invention and comprising the subassembly of FIG. 16.

Referring to FIGS. 15-17, the movement of the stripper plate (20) results in superposition of two motions, one from the motion of the core pin base cam (32C) and one from the motion of the stripper sleeve cam (34C). The two motions are superimposed on the stripper sleeve insert (33), which is intermediate the core pin base (32) and stripper sleeve (34). The superimposed motion occurs at the stripper sleeve insert (33) and thus the core pin sleeve (24), and results in motion thereof which is neither matched to the motion of the core pin base (32) or the stripper sleeve (34). The superimposed motion of the core pin sleeve (24) accomplishes three separate motions of the core pin sleeve (24), relative to the workpiece (80) removably mounted on the core pin (22).

The first motion is axial translation of the core pin sleeve (24) and axially breaks any vacuum holding the workpiece (80) to the core pin (22). The second motion is axial rotation of the core pin sleeve (24) which unscrews the workpiece (80) therefrom. The workpiece (80) is now loosely resting on the core pin (22). The third motion axially retracts the core pin (22), without rotation thereof, causing the workpiece (80) to fall off of the core pin (22). The workpiece (80) then may land in a bin or other receptacle for further processing, such as blow molding, stretch blow molding, assembly, etc.

One of skill will recognize that for constant angular rotation about the longitudinal axis L-L, an axially longer core pin base (32) may be utilized, provided that the core pin base cam (32C) has a lesser angle relative to the longitudinal axis L-L. This geometry may be suitable for fine tuning the motion as the stripper plate (20) moves in the axial direction. But this geometry may have the tradeoff of increasing stresses applied to the core pin cam (32C) follower during use.

Referring to FIGS. 18A-18D, four graphs of a non-limiting, exemplary cycle used to produce a preform (80) in a single cavity injection molding machine are shown. The preform (80) has a nominal external length of about 75 mm, an OD of about 12 mm at the barrel and an ID of about 10 mm at the barrel and is made of PET. The open end of the preform (80) has four overlapping threads, each thread subtending 100 degrees, having a lead of about 8.1 mm and a pitch of about 2.0 mm between threads.

Five positions of the components of the drive system (15) of the present invention are shown at Positions 1-5, respectively, on FIGS. 18A-18D. Position 1 occurs at time=0.0 seconds, i.e. at initiation of the retraction stroke of the drive system (15) in the rearward direction. Position 2 occurs at time=0.02 seconds, the initiation of stripper sleeve (34) rotation in addition to stripper sleeve (34) axial movement. Position 3 occurs at time=0.11 seconds, when the preform (80), begins to move away from the stripper plate (20) in the forward direction. The preform (80) axial displacement lags the stripper sleeve (34) axial displacement to ensure the preform (80) is clear of the threads before pushoff. Position 4 occurs at time=0.17 seconds, when the stripper sleeve (34) stops rotating. Position 5 occurs at time=0.22 seconds, during steady state displacements.

In one embodiment the apparatus (10) of the invention advantageously comprises a combination of a stripper plate (20) and a core pin (22) which move together and have no relative motion therebetween. Particularly the stripper plate (20) and core pin (22) have no rotational or axial translation therebetween. This arrangement advantageously eliminates the need for rotary water seals if liquid cooling is desired.

A core pin sleeve (24) moves axially and rotationally relative to the stripper plate (20) while the stripper plate (20) is in motion, particularly forward motion. The core pin sleeve (20) is not driven by a rack or pinion, allowing the apparatus (10) to customize each mold half (12) pair to the specific workpiece (80) desired. Also, the core pin sleeve (24) is driven by the cavity plate (20), so that only a single, axial drive system is needed and a dedicated drive, pinion gear and rack are not needed in the apparatus (10). Advantageously, the rotary and axial three dimensional motion of the core pin sleeve (24) is responsive to axial motion of the stripper plate (20).

One benefit of the present invention is that it advantageously eliminates the need for a rack gear or helical splined shaft, as required by the prior art. Furthermore, the present invention is well suited to workpieces (80), such as preforms (80), having an aspect ratio of at least 2, 3, 4, or more up to 10. The aspect ratio is the overall length of the preform divided by the maximum diameter of the preform. It is noted that common internally threaded lids and closures used for water bottles and food containers have an aspect ratio less than 1.

Referring particularly to FIG. 18A, in operation the two mold halves (12) come together and the workpiece (80) is formed. The stripper plate (20) retracts approximately 70 mm, in the rearward axial direction, during the retraction stroke of a cycle. Of course, the forward stroke is also approximately 70 mm, to complete one cycle. After retraction has occurred, and the workpiece (80) is free from the mold cavity, then the forward stroke of the stripper plate (20) can occur and the internally threaded preform (80) be unscrewed. The core pin (22), core pin base (32) and collar (70) are restrained from forward axial movement and held stationary while the stripper plate (20), stripper sleeve (34), stripper sleeve insert (33) and core pin sleeve (24) are moved forward, as described below.

FIG. 18A shows that the retraction stroke occurs at constant stripper plate (20) velocity, accounting for startup and reversal acceleration/deceleration. The slope of the graph gives the stripper plate (20) velocity.

Referring to FIG. 18B, it is seen that stripper sleeve insert (33) rotation occurs between positions 2 and 4. Positions 2-4 represent the approximate start and end of the spiral wrap of the core pin cam (32C) about the core pin (22). Concomitant rotation of the core pin cam follower (32F) during translation of the stripper plate (20) from Positions 2-4 causes rotation of the stripper sleeve insert (33) and therefore the core pin sleeve (24). The lead of the core pin cam (32C) matches the lead of the threads of the workpiece (80) being molded and released from the core pin (22). The straight, downwardly sloped line extending from Position 2 to Position 4 has an angle corresponding to the angle of the internal threads in the preform (80) relative to the longitudinal axis. The slope of this line gives the angular velocity of the preform (80) as it is being unscrewed. Only insignificant stripper sleeve insert (33) rotation occurs from Positions 1-2 and 4-5.

Referring to FIG. 18C the stripper sleeve insert (33) has essentially no displacement in the axial direction relative to the cavity between Positions 1 and 2. Between Positions 2 and 3, the stripper sleeve cam follower (34F) moves circumferentially and slightly axially within the stripper sleeve (34) cam. The axial movement of the stripper sleeve cam follower (34F) is superimposed with the movement of the core pin cam follower (32F) to cause the stripper sleeve insert (33) to move axially relative to the stripper plate (20). From Position 4 to the end of the stroke, the stripper sleeve cam follower (34F) and core pin cam follower (32F) both move axially, superimposing this displacement on the stripper sleeve insert (33) as shown.

Referring to FIG. 18D, the preform (80) displacement relative to the stripper plate (20) is shown to begin slightly negative from Position 1 to a position approximately 30 percent towards Position 2. This displacement from the negative starting point to a neutral displacement, indicated as 0.0 represents release of surface cohesion between the interior of the preform (80) and the mold. During the unwinding of the preform (80) from the core pin sleeve (24) between Positions 2 and 3, negative axial movement of the stripper sleeve (34)cam follower is superimposed with the positive axial movement of the core pin cam follower (32F), preventing axial movement of the preform (80) relative to the stripper plate (20). Between Positions 3 and 4, axial movement of the preform (80) is dominated by the axial displacement of the core pin cam follower (32F). The preform (80) is released from the core pin (22) at approximately 75% percent of the travel between Positions 3 and 4, as shown by the vertical disturbance in the graph. Between Positions 4 and 5 axial movement of the preform (80) is dominated by the axial movement of the stripper sleeve cam follower (34F). But the preform (80) is free and further displacement relative to the stripper plate (20) does not occur, as the preform (80) is released from the core pin (22).

Figure 19A:
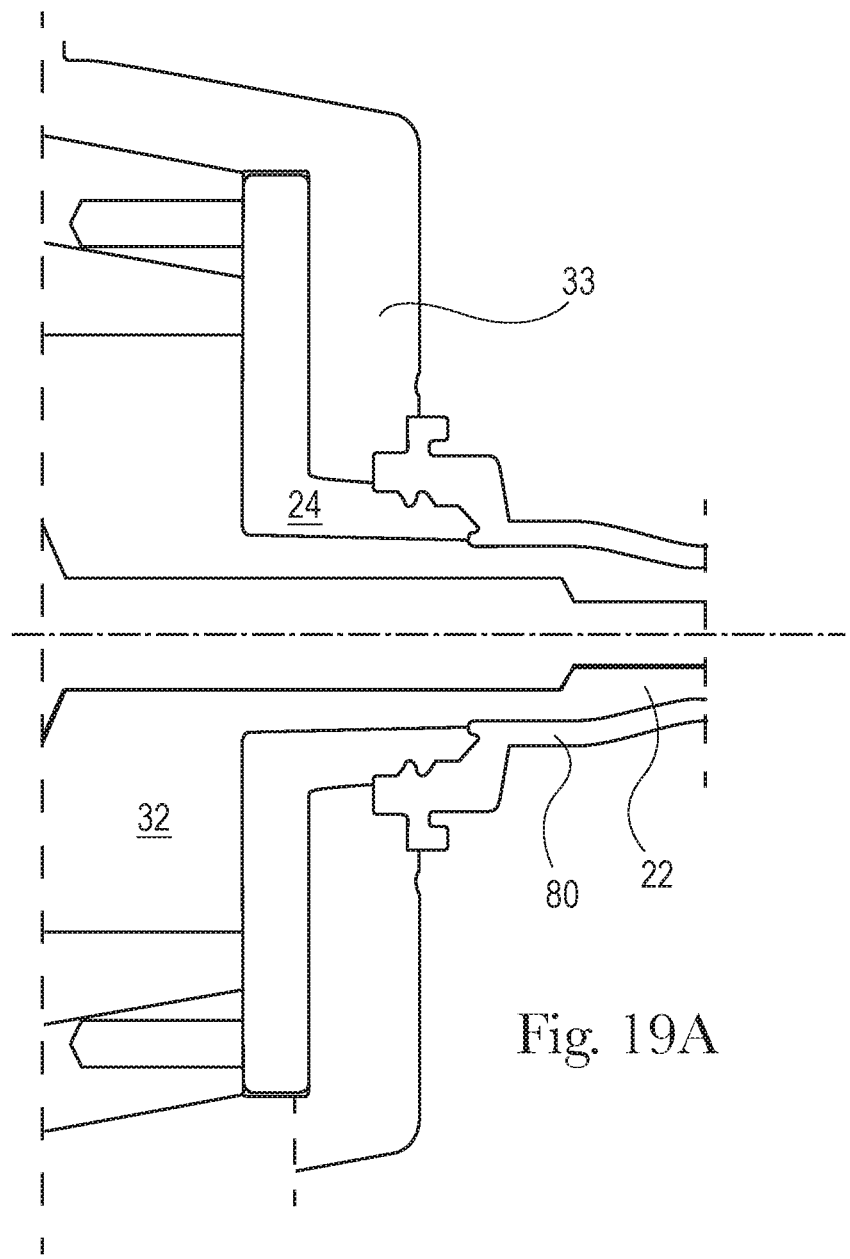
FIG. 19A is a fragmentary sectional view taken along lines 19-19 of FIG. 10 and showing a workpiece, on the core pin, in Position 1 of FIGS. 18A-18D.
Figure 19B:
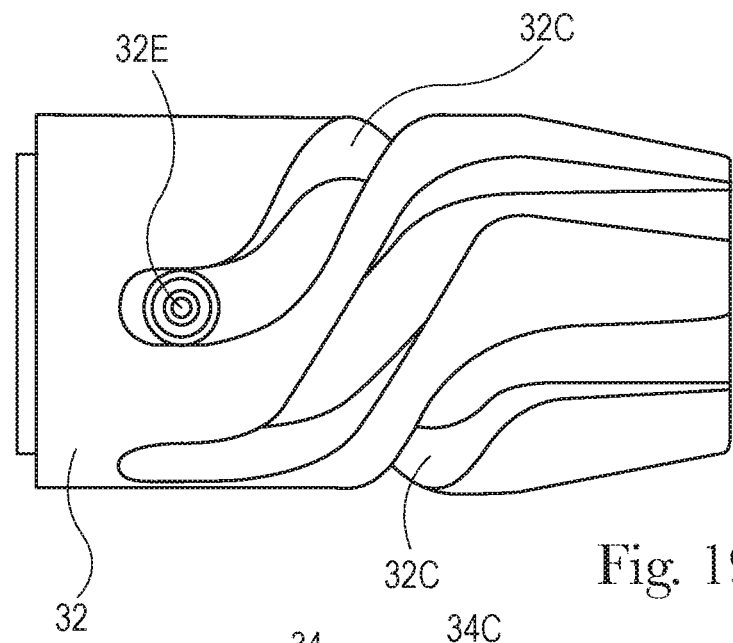
FIG. 19B is a side elevational view of a core pin base having a core pin base follower in Position 1 of FIGS. 18A-18D.
Figure 19C:
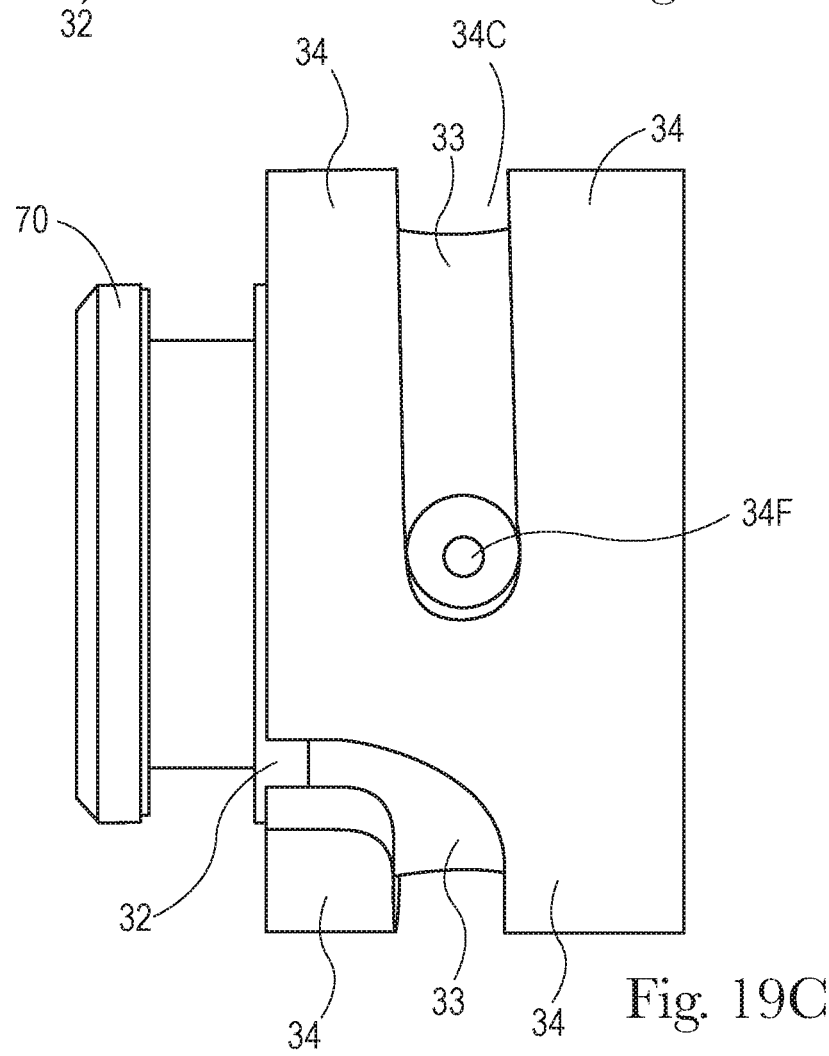
FIG. 19C is a side elevational view of a stripper sleeve having a stripper sleeve follower in Position 1 of FIGS. 18A-18D.

Referring to FIGS. 19A-19C, the initial positions of the drive system (15), core pin cam (32C) and respective core pin cam follower (32F), stripper sleeve cam (34C), respective stripper sleeve cam follower (34F) and stripper sleeve insert (33) are shown in their respective positions, after solidification of the preform (80) occurs. Referring to FIG. 19A, the preform (80) is tightly screwed onto the core pin sleeve (24). Referring to FIGS. 19B-19C, the core pin cam follower (32F) and stripper sleeve cam follower (34C) are shown in the corresponding initial positions.

Figure 20A:
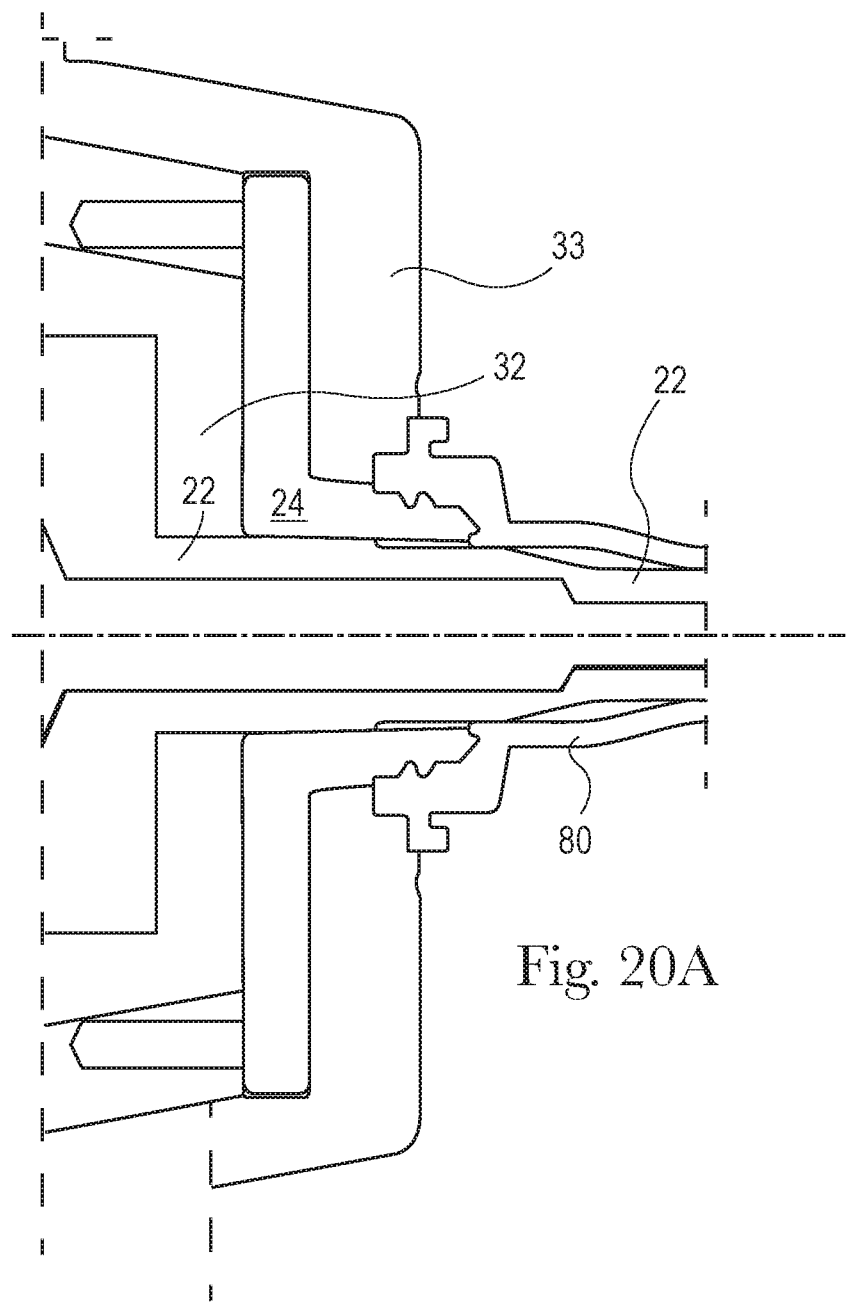
FIG. 20A is a fragmentary sectional view of the subassembly of FIG. 19A, shown in Position 2 of FIGS. 18A-18D.
Figure 20B:
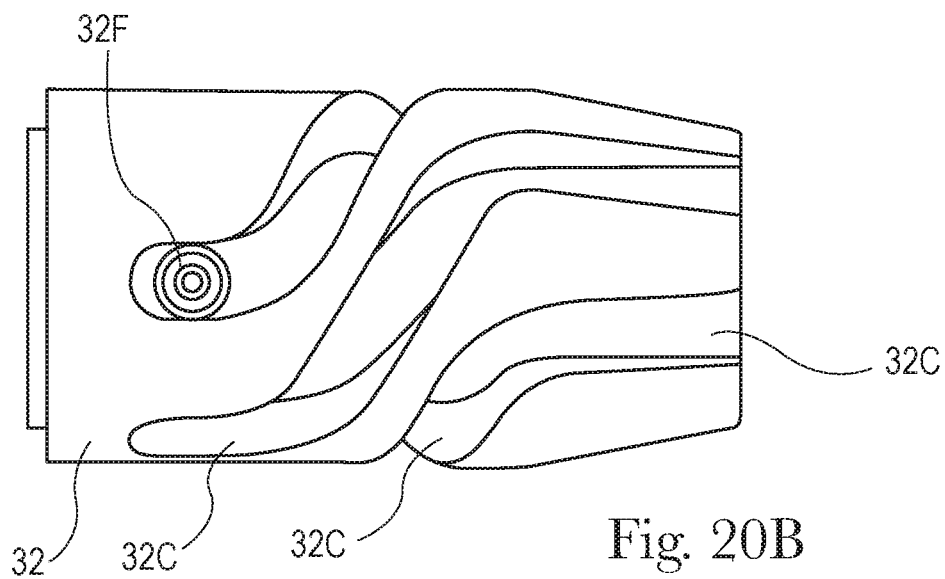
FIG. 20B is a side elevational view of a core pin base having a core pin base follower in Position 2 of FIGS. 18A-18D.
Figure 20C:
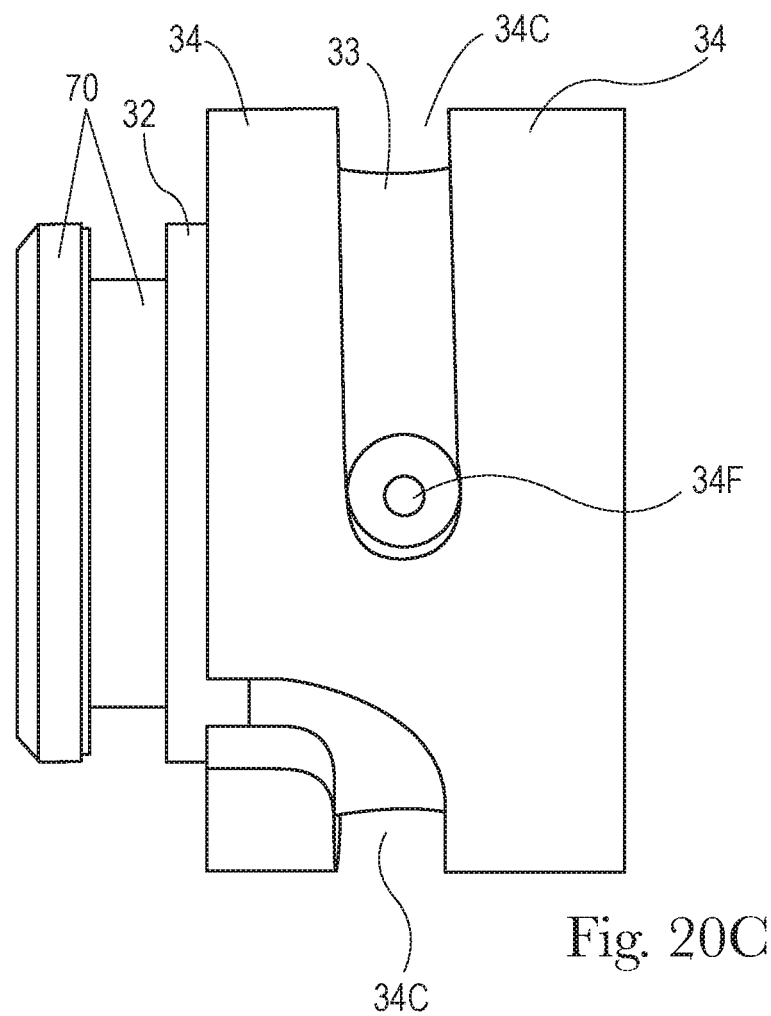
FIG. 20C is a side elevational view of a stripper sleeve have a stripper sleeve follower in Position 2 of FIGS. 18A-18D.

Referring to FIGS. 20A-20C, the core pin (22) is shown to have axially retracted from the preform (80), breaking a surface cohesion which may hold the preform (80) in place. From Position 1 to Position 2 the core pin (22) cam follower has axially advanced in the core pin cam (32C). The stripper sleeve cam (34C) has not moved circumferentially in the stripper sleeve cam (34C). The core pin sleeve (24) is shown to have not rotated about the longitudinal axis L-L.

Figure 21A:
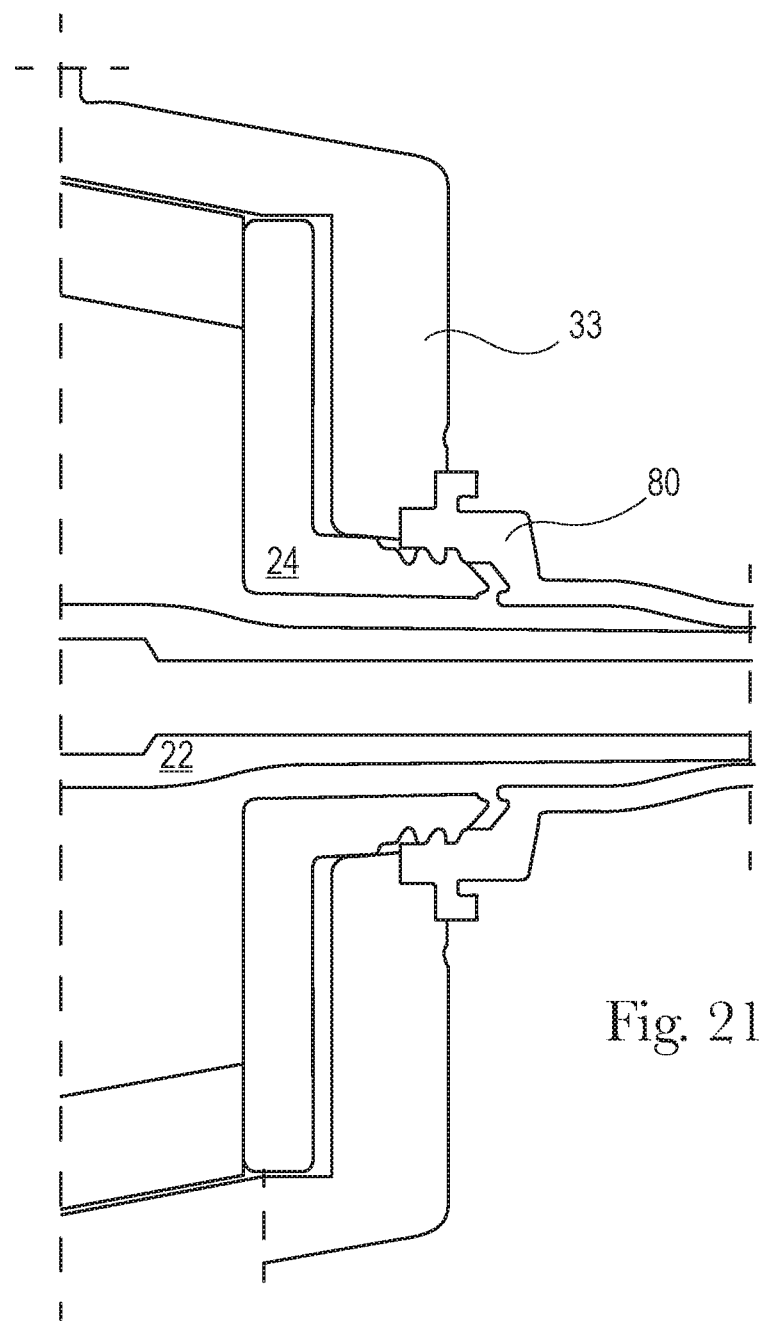
FIG. 21A is a fragmentary sectional view of the subassembly of FIG. 19A, shown in Position 3 of FIGS. 18A-18D.
Figure 21B:
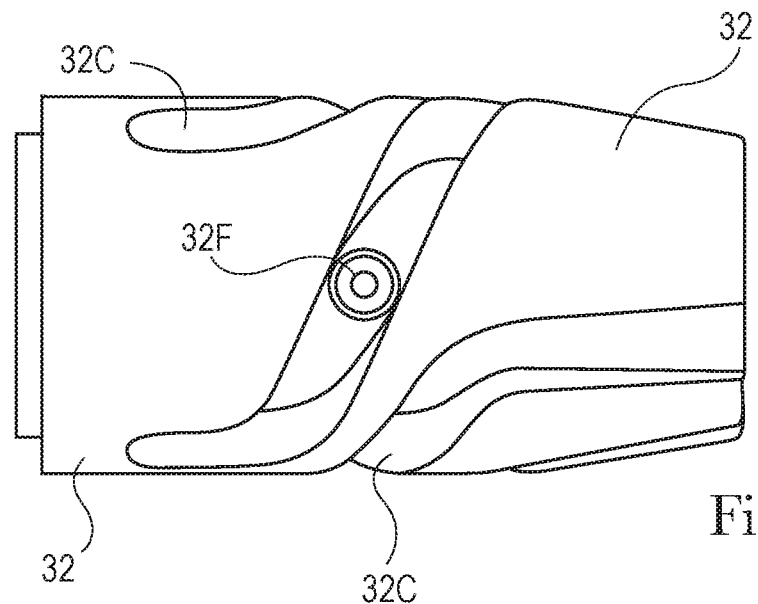
FIG. 21B is a side elevational view of a core pin base having a core pin base follower in Position 3 of FIGS. 18A-18D.
Figure 21C:
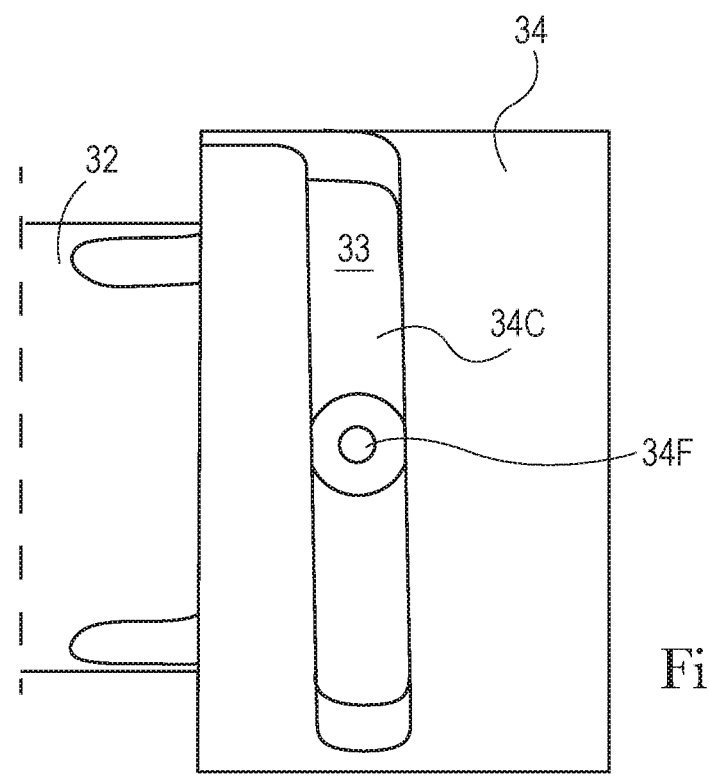
FIG. 21C is a fragmentary side elevational view of a stripper sleeve have a stripper sleeve follower in Position 3 of FIGS. 18A-18D.

Referring to FIGS. 21A-21C, the preform (80) is shown to be partially unscrewed from the core pin sleeve (24). The core pin cam follower (32F) has moved in the unscrewing direction within the spiral portion of the core pin (22) cam. The stripper sleeve cam follower (34F) has predominantly moved circumferentially from its initial position.

Figure 22A:
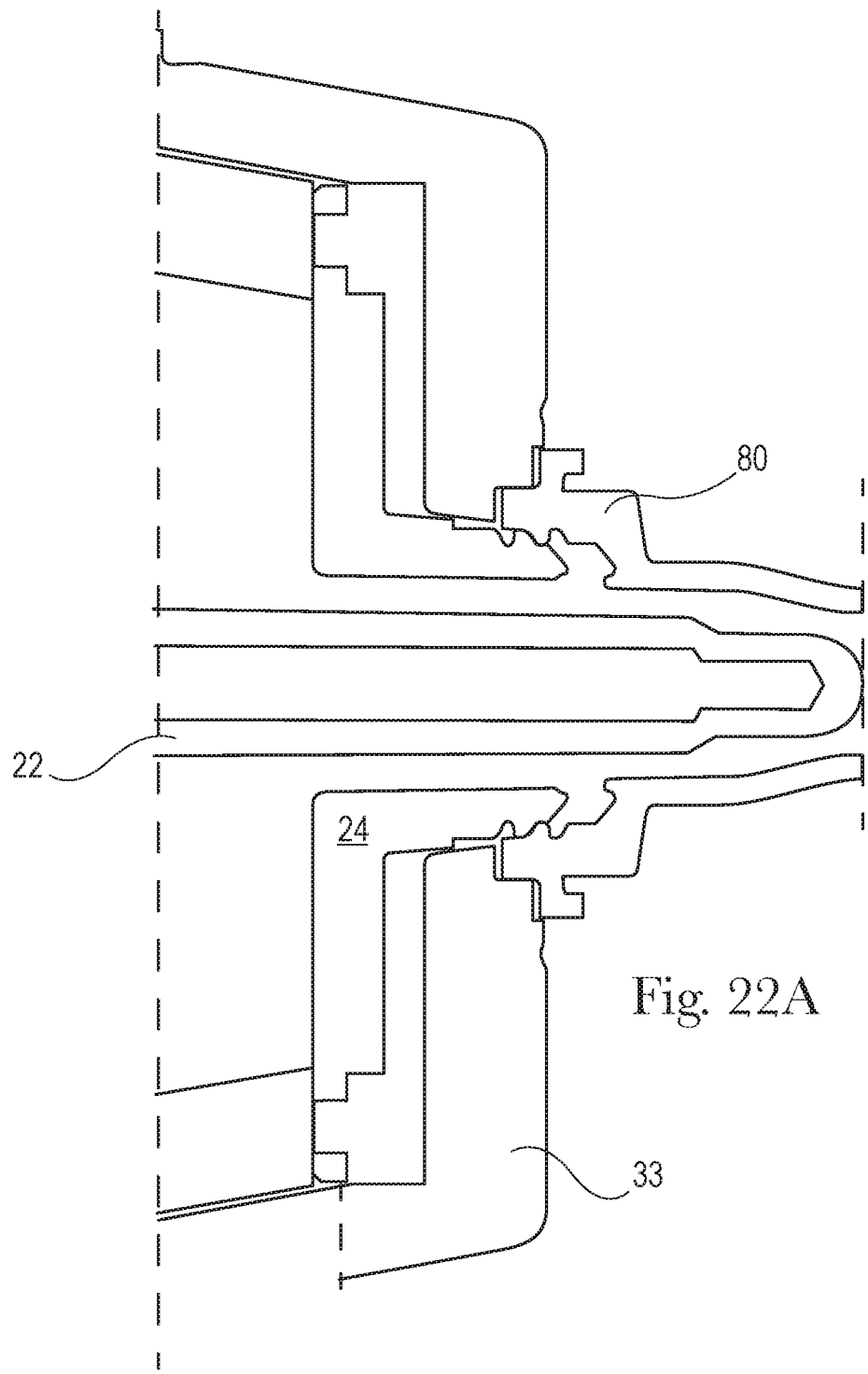
FIG. 22A is a fragmentary sectional view of the subassembly of FIG. 19A, shown in Position 4 of FIGS. 18A-18D.
Figure 22B:
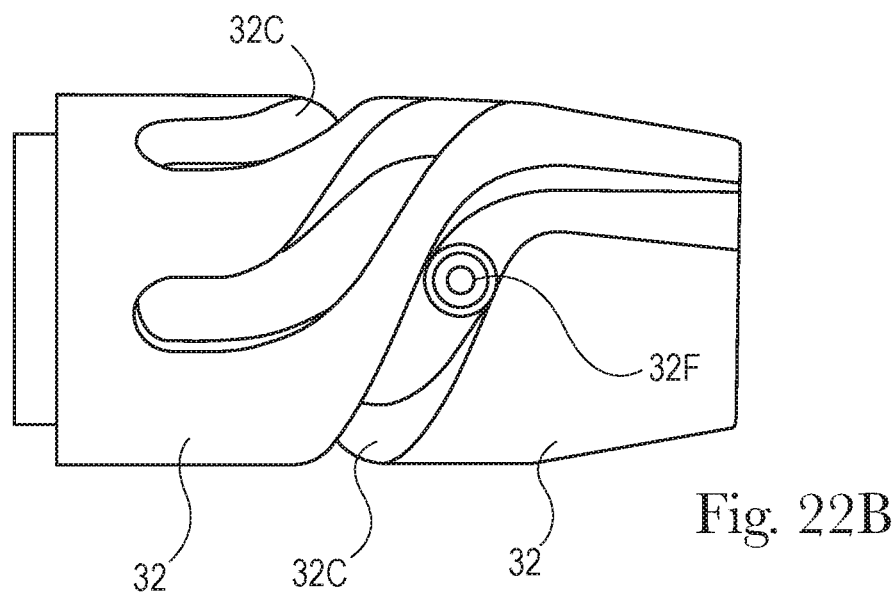
FIG. 22B is a side elevational view of a core pin base having a core pin base follower in Position 4 of FIGS. 18A-18D.
Figure 22C:
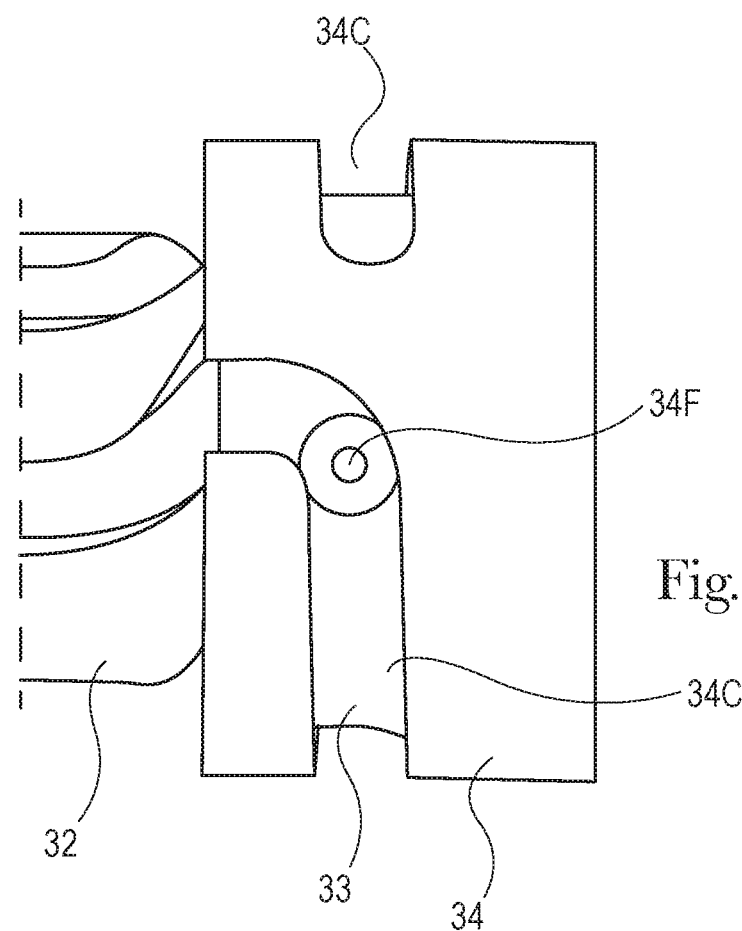
FIG. 22C is a fragmentary side elevational view of a stripper sleeve having a stripper sleeve follower in Position 4 of FIGS. 18A-18D.

Referring to FIGS. 22A-22C, the preform (80) is almost released from the core pin sleeve (24). The core pin cam follower (32F) and stripper sleeve cam follower (34F) are at the end of spiral travel in the core pin cam (32C) and end of circumferential travel stripper sleeve cam (34C), respectively.

Figure 23A:
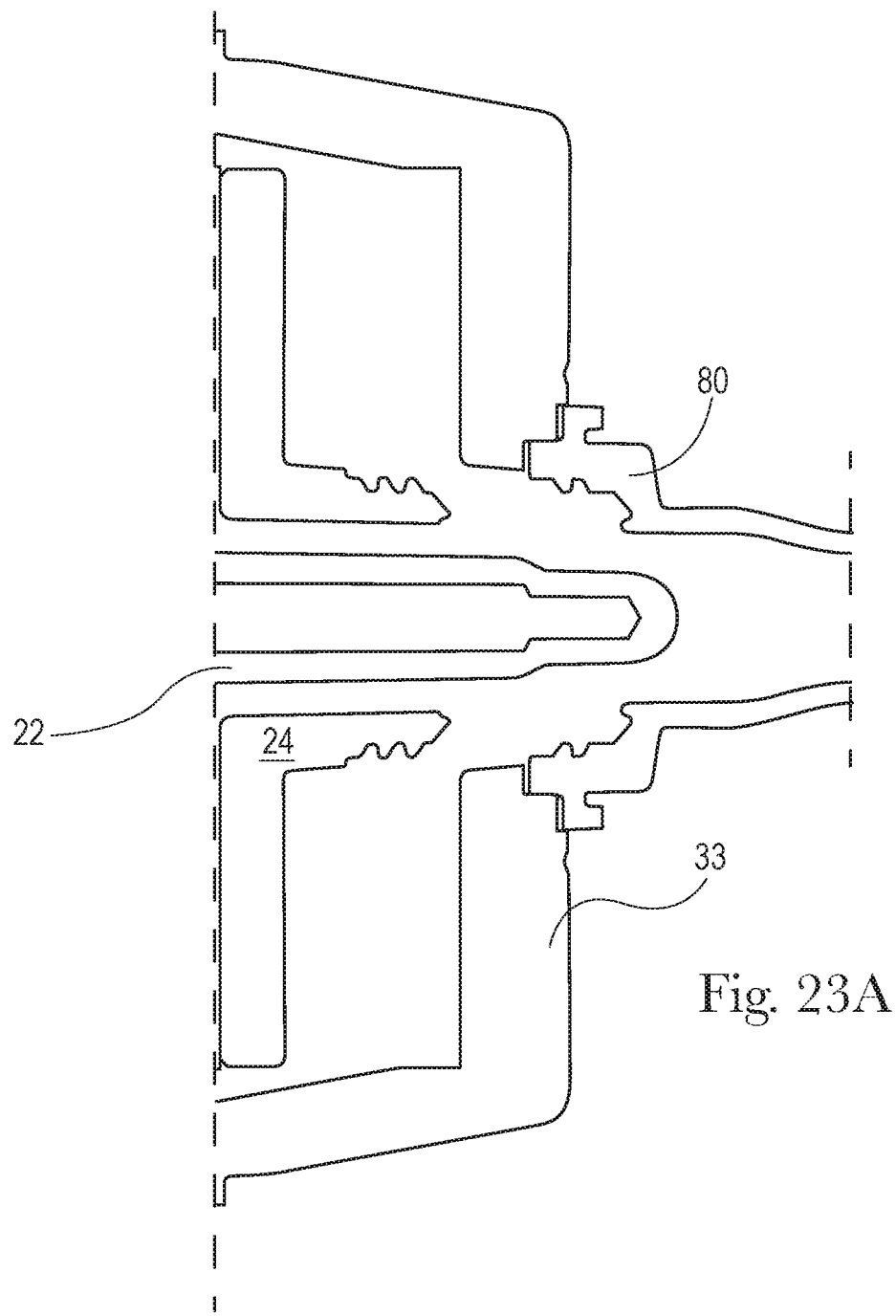
FIG. 23A is a fragmentary sectional view of the subassembly of FIG. 19A, shown in Position 5 of FIGS. 18A-18D.
Figure 23B:
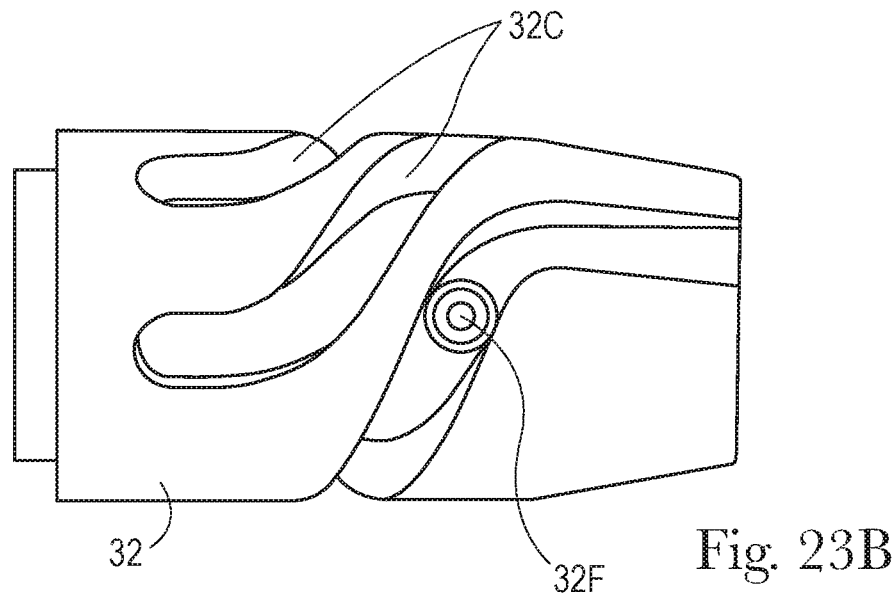
FIG. 23B is a side elevational view of a core pin base having a core pin base follower in Position 5 of FIGS. 18A-18D.
Figure 23C:
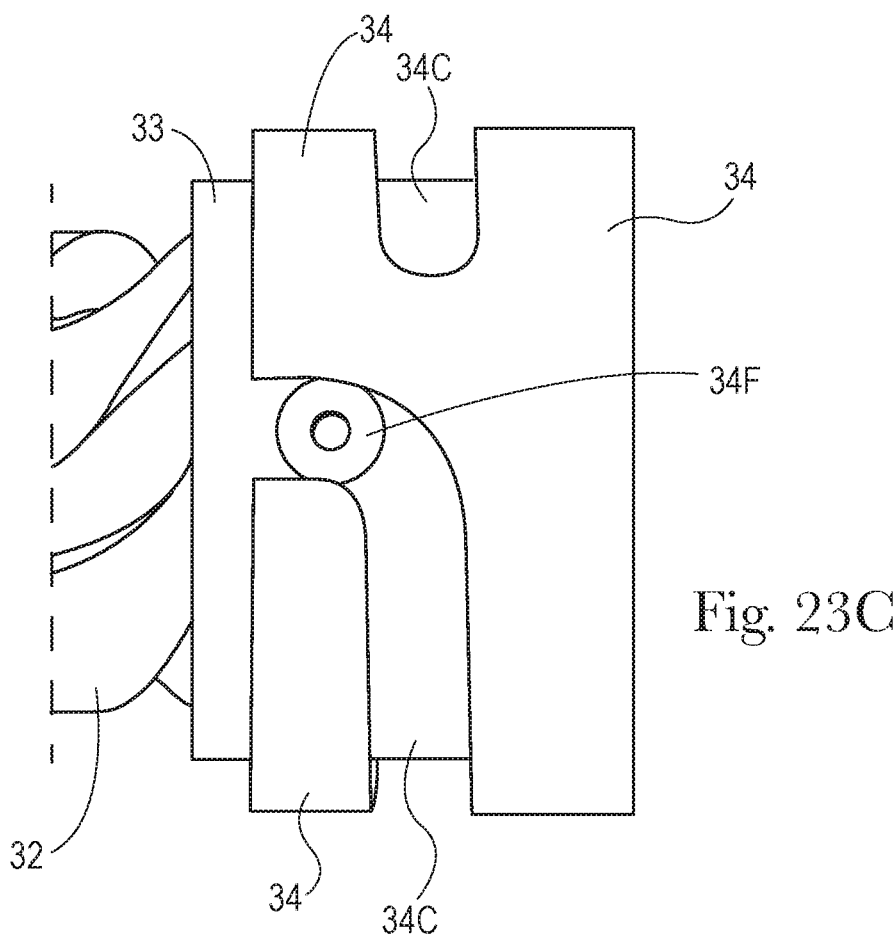
FIG. 23C is a fragmentary side elevational view of a stripper sleeve have a stripper sleeve follower in Position 5 of FIGS. 18A-18D.

Referring to FIGS. 23A-23C, the preform (80) is shown to be free from the core pin (22) and core pin sleeve (24). The preform (80) can fall into a collection bin or otherwise be removed from the drive system (15) for further processing. The core pin cam follower (32F) is at the end of travel in the core pin cam 932C). The stripper sleeve cam follower (34F) has moved axially in the travel stripper sleeve cam (34C).

Both the core pin cam follower (32F) and stripper sleeve cam follower (34F) are in their final positions. The stripper plate (20) has finished its axial displacement in the retraction direction, so the stroke is complete. The stripper plate (20) will now axially move in the forward direction for a second stroke, to complete the cycle.

Combinations

A. In one embodiment the invention comprises a drive system (15) for an injection molding apparatus (10), said drive system (15) having a longitudinal axis defining an axial direction and comprising:

a stripper plate (20) mounted for bilateral reciprocating motion, said stripper plate (20) having a first face (20F) and a second face (20S) opposed thereto;

a core pin (22) protruding outwardly and forwardly through a hole in said stripper plate (20), said core pin (22) being usable to form a cavity in a molded workpiece (80);

a core pin sleeve (24) circumscribing said core pin (22) and being juxtaposed with said first face (20F) of said stripper plate (20), said core pin sleeve (24) having a feature to form an undercut in a molded workpiece (80) removably disposed on said core pin (22);

a hollow stripper sleeve (34), said stripper sleeve (34) being rigidly joined to said second face (20S) of said stripper plate (20), said stripper sleeve (34) being concentric with said core pin (22) and circumscribing said axis, said stripper sleeve (34) having at least one stripper sleeve cam (34C) therein, said stripper sleeve cam (34C) providing for responsive motion of a respective stripper sleeve follower (34F) when said stripper plate (20) is moved in an axial direction;

a core pin base (32) rigidly joined to said core pin (22) and being disposed rearwardly of said second face (20S) of said stripper plate (20), said core pin base (32) having at least one core pin base (32) cam therein, said core pin base cam (32C) providing for responsive motion of a respective core pin base follower (32F) when said stripper plate (20) is moved in an axial direction;

a stripper sleeve insert (33) intermediate said stripper sleeve (34) and said core pin base (32); said stripper sleeve insert (33) having an outwardly extending stripper sleeve follower (34F) cooperating with said stripper sleeve cam (34C) and an inwardly extending core pin base follower (32F) cooperating with said core pin base cam (32C), said stripper sleeve insert (33) being rigidly joined to said core pin sleeve (24), whereby axial movement of said stripper plate (20) causes motion of said stripper sleeve (34) and said core pin base (32) to be superimposed onto said stripper sleeve insert (33) to cause responsive motion in said core pin sleeve (24).

B. A drive system (15) according to paragraph A wherein said core pin sleeve (24) moves axially and rotationally in response to said superimposed motion of said stripper sleeve (34) and said core pin base (32).

C. A drive system (15) according to paragraph B wherein said wherein said core pin sleeve (24) simultaneously moves axially and rotationally.

D. A drive system (15) according to paragraphs A, B and C wherein said stripper sleeve (34) and said core pin base (32) each has a pair of complementary cams therein.

E. A drive system (15) according to paragraphs A, B, C and D wherein said stripper sleeve cam (34C) has a cam portion which is axially parallel.

F. A drive system (15) according to paragraphs A, B, C, D and E wherein said stripper sleeve cam (34C) has a cam portion which is circumferentially oriented.

G. A drive system (15) according to paragraphs A, B, C, D, E and F wherein said core pin base cam (32C) has a cam portion which is parallel to said axis.

H. A drive system (15) according to paragraphs A, B, C, D, E, F and G further comprising a stripper ring (28) rigidly joined to said first face (20F) of said stripper plate (20), and circumscribing said core pin sleeve (24), whereby said core pin sleeve (24) and said core pin (22) protrude through said stripper ring (28).

I. A drive system (15) according to paragraph H wherein said stripper ring (28) is generally frustroconically shaped from a base, said base being joined to said stripper plate (20).

J. A drive system (15) according to paragraphs A, B, C, D, E, F, G, H and I wherein said core pin (22) is hollow, and further comprising a bubbler (21) therein.

K. In another embodiment the invention comprises an injection molding apparatus (10) having a drive system (15) reciprocating in an axial direction, said injection molding apparatus (10) comprising:

first and second mold halves which open and close in the axial direction, said first mold half and said second mold half defining a cavity for molding a workpiece (80) therein;

one said mold half comprising a stripper plate (20) mounted for bilateral reciprocating motion and being drivable in the axial direction, said stripper plate (20) having a first face (20F) and a second face (20S) opposed thereto;

a core pin (22) protruding outwardly through a hole in said stripper plate (20), said core pin (22) being usable to form a cavity in a molded workpiece (80);

a core pin sleeve (24) circumscribing said core pin (22) and being juxtaposed with said first face (20F) of said stripper plate (20), said core pin sleeve (24) having a feature to form an undercut in a molded workpiece (80) removably disposed on said core pin (22);

a hollow stripper sleeve (34), said stripper sleeve (34) being rigidly joined to said second face (20S) of said stripper plate (20), said stripper sleeve (34) being concentric with said core pin (22) and circumscribing said axis, said stripper sleeve (34) having at least one stripper sleeve cam (34C) therein, said stripper sleeve cam (34C) providing for responsive motion of a respective stripper sleeve follower (34F) when said stripper plate (20) is moved in an axial direction;

a core pin base (32) rigidly joined to said core pin (22) and being disposed rearwardly of said second face (20S) of said stripper plate (20), said core pin base (32) having at least one core pin base cam (32C) therein, said core pin base cam (32C) providing for responsive motion of a respective core pin base follower (32F) when said stripper plate (20) is moved in an axial direction;

a stripper sleeve insert (33) intermediate said stripper sleeve (34) and said core pin base (32); said stripper sleeve insert (33) having an outwardly extending stripper sleeve follower (34F) cooperating with said stripper sleeve cam (34C) and an inwardly extending core pin base follower (32F) cooperating with said core pin base cam (32C), said stripper sleeve insert (33) being rigidly joined to said core pin sleeve (24), whereby axial movement of said stripper plate (20) causes motion of said stripper sleeve (34) and said core pin base (32) to be superimposed onto said stripper sleeve insert (33) to cause responsive motion in said core pin sleeve (24) to remove a workpiece (80) from and molded on said core pin (22).

L. An injection molding apparatus (10) according to paragraph K wherein both said mold halves move alternatingly towards and away from each other.

M. An injection molding apparatus (10) according to paragraph K wherein said first mold half comprises said stripper plate (20) and said core pin (22), and said second mold half is stationary.

N. An injection molding apparatus (10) according to paragraphs K, L and M wherein said core pin (22) defines a longitudinal axis, said core pin (22) not axially rotating about said longitudinal axis.

O. An injection molding apparatus (10) according to paragraphs K, L, M and N wherein said stripper plate (20) is generally perpendicular to said longitudinal axis.

P. A drive system (15) for an injection molding apparatus (10), said drive system (15) having an axis and comprising:

a stripper plate (20) for axial motion and being drivable in an axial direction, said stripper plate (20) having a first face (20F) and a second face (20S) opposed thereto; and a core pin (22) protruding outwardly from said first face (20F) of said stripper plate (20), said core pin (22) being usable to form a cavity in a molded workpiece (80), said core pin (22) not being movable relative to said stripper plate (20) while said stripper plate (20) is in motion;

a core pin sleeve disposed radially outboard of said core pin and being juxtaposed with said first face of said stripper plate (20), said core pin sleeve having features to form an undercut in a molded workpiece (80), whereby said core pin sleeve (24) is axially and rotatably movable relative to said stripper plate (20) while said stripper plate (20) is in motion, said core pin sleeve being axially and rotatably driven by axial motion of said stripper plate (20).

Q. A drive system (15) according to paragraph P wherein said stripper plate (20) is mounted for alternatingly forward and retraction axial motion, and motion of said core pin sleeve (24) is responsive to forward motion of said stripper plate (20).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" whether or not the term 'about' is expressly recited. Every range disclosed herein includes all endpoints of that range whether disclosed within that range or as part of a related range. Thus two endpoints of the same range may be disclosed as endpoints of broader or narrower ranges. The common mathematical symbols>and<mean greater than or equal to and less than or equal to, respectively, and include the endpoints set forth in the equations and inequalities below.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A drive system for an injection molding apparatus, said drive system having a longitudinal axis defining an axial direction and comprising:
   a stripper plate mounted for bilateral reciprocating motion, said stripper plate having a first face and a second face opposed thereto;
   a core pin protruding outwardly from said first face of said stripper plate, said core pin being usable to form a cavity in a molded workpiece;
   a core pin sleeve disposed radially outboard of said core pin, said core pin sleeve having a feature to form an undercut in a molded workpiece;
   a core pin base rigidly joined to said core pin, wherein said core pin base comprises a core pin base cam;
   a hollow stripper sleeve, said hollow stripper sleeve being rigidly joined to said second face of said stripper plate, said hollow stripper sleeve being concentric with said core pin and circumscribing said longitudinal axis, said hollow stripper sleeve having at least one stripper sleeve cam; and
   a stripper sleeve insert intermediate said hollow stripper sleeve and said core pin base; said stripper sleeve insert having an outwardly extending stripper sleeve follower cooperating with said stripper sleeve cam and an inwardly extending core pin base follower cooperating with said core pin base cam,
   whereby axial movement of said stripper plate causes responsive axial and/or rotational motion of said hollow stripper sleeve and said core pin base to be superimposed onto said core pin sleeve to release a workpiece having an undercut from said core pin sleeve; and
   wherein said core pin does not translate or rotate relative to said stripper plate.

2. The drive system according to claim 1 wherein said core pin sleeve moves axially and rotationally in response to said superimposed motion of said hollow stripper sleeve and said core pin base.

3. The drive system according to claim 2 wherein said wherein said core pin sleeve simultaneously moves axially and rotationally.

4. The drive system according to claim 2 wherein said stripper sleeve cam does not subtend 360 degrees about said hollow stripper sleeve.

5. The drive system according to claim 4 wherein said stripper sleeve cam has a cam portion which is axially parallel.

6. The drive system according to claim 5 wherein said core pin base cam has a cam portion which is parallel to said longitudinal axis.

7. The drive system according to claim 6 wherein said stripper sleeve cam has a cam portion which is circumferentially oriented.

8. A drive system for an injection molding apparatus, said drive system having a longitudinal axis defining an axial direction and comprising:
   a stripper plate mounted for bilateral reciprocating motion, said stripper plate having a first face and a second face opposed thereto;
   a core pin protruding outwardly and forwardly through a hole in said stripper plate, said core pin being usable to form a cavity in a molded workpiece;
   a core pin sleeve circumscribing said core pin and being juxtaposed with said first face of said stripper plate, said core pin sleeve having a feature to form an undercut in a molded workpiece removably disposed on said core pin;
   a hollow stripper sleeve, said hollow stripper sleeve being rigidly joined to said second face of said stripper plate, said hollow stripper sleeve being concentric with said core pin and circumscribing said longitudinal axis, said hollow stripper sleeve having at least one stripper sleeve cam therein, said stripper sleeve cam providing for responsive motion of a respective stripper sleeve follower when said stripper plate is moved in the axial direction;
   a core pin base rigidly joined to said core pin, said core pin base having at least one core pin base cam therein, said core pin base cam providing for responsive motion of a respective core pin base follower when said stripper plate is moved in the axial direction;

a stripper sleeve insert intermediate sad hollow stripper sleeve and said core pin base; said stripper sleeve insert having an outwardly extending stripper sleeve follower cooperating with said stripper sleeve cam and an inwardly extending core pin base follower cooperating with said core pin base cam, said stripper sleeve insert being rigidly joined to said core pin sleeve, whereby axial movement of said stripper plate causes motion of said hollow stripper sleeve and said core pin base to be superimposed onto said stripper sleeve insert to cause responsive axial and/or rotational motion in said core pin sleeve; and wherein said core pin does not translate or rotate relative to said stripper plate.

9. The drive system according to claim 8 further comprising a stripper ring rigidly joined to said first face of said stripper plate, and circumscribing said core pin sleeve, whereby said core pin sleeve and said core pin protrude through said stripper ring.

10. The drive system according to claim 9 wherein said stripper ring is generally frustroconically shaped from a base, said base being joined to said stripper plate.

11. The drive system according to claim 8 wherein said core pin and said core pin base are integral.

12. The drive system according to claim 8 wherein said stripper sleeve insert and said core pin sleeve are modular and can be disassembled.

13. The drive system according to claim 8 wherein said core pin is hollow, and further comprising a bubbler therein.

14. An injection molding apparatus having a drive system reciprocating along a longitudinal axis in an axial direction, said injection molding apparatus comprising:

a first mold half and a second mold half which open and close in the axial direction, said first mold half and said second mold half defining a cavity for molding a workpiece therein;

one of said mold halves comprising a stripper plate drivable in the axial direction, said stripper plate having a first face and a second face opposed thereto;

a core pin protruding outwardly through a hole in said stripper plate, said core pin being usable to form the cavity in a molded workpiece;

a core pin sleeve circumscribing said core pin and being juxtaposed with said first face of said stripper plate, said core pin sleeve having a feature to form an undercut in a molded workpiece removably disposed on said core pin;

a hollow stripper sleeve, said hollow stripper sleeve being rigidly joined to said second face of said stripper plate, said hollow stripper sleeve being concentric with said core pin and circumscribing said longitudinal axis, said hollow stripper sleeve having at least one stripper sleeve cam therein, said stripper sleeve cam providing for responsive motion of a stripper sleeve follower when said stripper plate is moved in the axial direction;

a core pin base rigidly joined to said core pin, said core pin base having at least one core pin base cam therein, said core pin base cam providing for responsive motion of a core pin base follower when said stripper plate is moved in the axial direction;

a stripper sleeve insert intermediate said hollow stripper sleeve and said core pin base; said stripper sleeve insert having the outwardly extending stripper sleeve follower cooperating with said stripper sleeve cam and the inwardly extending core pin base follower cooperating with said core pin base cam, said stripper sleeve insert being rigidly joined to said core pin sleeve, whereby axial moment of said stripper plate causes motion of said hollow stripper sleeve and said core pin base to be superimposed onto said stripper see insert to cause responsive axial and/or rotational motion in said core pin sleeve to remove a workpiece from and molded on said core pin; and wherein said core pin does not translate or rotate relative to said stripper plate.

15. The injection molding apparatus according to claim 14 wherein said first mold half and said second mold half move alternatingly towards and away from each other.

16. The injection molding apparatus according to claim 14 wherein said first mold half comprises said stripper plate and said core pin, and said second mold half is stationary.

17. The injection molding apparatus according to claim 14 wherein said core pin defines a longitudinal axis, said core pin not axially rotating about said longitudinal axis.

18. The injection molding apparatus according to claim 17 wherein said core pin has a length of 4 cm to 20 cm.

19. The injection molding apparatus according to claim 18 wherein said stripper plate is perpendicular to said longitudinal axis.

* * * * *